(12) United States Patent
Takahara

(10) Patent No.: US 7,198,289 B2
(45) Date of Patent: Apr. 3, 2007

(54) HEAD PORTION PROTECTING AIR BAG APPARATUS

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 145 days.

(21) Appl. No.: 10/451,432

(22) PCT Filed: Dec. 27, 2001

(86) PCT No.: PCT/IB01/02691

§ 371 (c)(1),
(2), (4) Date: Jun. 23, 2003

(87) PCT Pub. No.: WO02/051672

PCT Pub. Date: Jul. 4, 2002

(65) Prior Publication Data

US 2004/0026907 A1 Feb. 12, 2004

(30) Foreign Application Priority Data

Dec. 27, 2000 (JP) ............................. 2000-398693
Jun. 11, 2001 (JP) ............................. 2001-175860

(51) Int. Cl.
*B60R 21/16* (2006.01)
(52) U.S. Cl. .............................. 280/730.2; 280/743.1; 280/729
(58) Field of Classification Search ................ 280/729, 280/730.2, 730.1, 743.1, 743.2, 740, 728.2
See application file for complete search history.

(56) References Cited

U.S. PATENT DOCUMENTS 5,899,491 A * 5/1999 Tschaeschke ............ 280/730.2

6,010,149 A * 1/2000 Riedel et al. ................ 280/729
6,237,941 B1 * 5/2001 Bailey et al. ................ 280/729
6,402,191 B1 * 6/2002 Sinnhuber .................... 280/729
6,543,804 B2 * 4/2003 Fischer ..................... 280/730.2

FOREIGN PATENT DOCUMENTS

| CN | 1181040 A | 5/1998 |
|---|---|---|
| DE | 198 41 493 A1 | 3/1999 |
| DE | 298 23 008 U1 | 4/1999 |
| GB | 2 326 385 A | 12/1998 |
| JP | A 10-291457 | 11/1998 |
| JP | A 11-70848 | 3/1999 |
| JP | A 11-301394 | 11/1999 |
| JP | A 11-321536 | 11/1999 |
| JP | A 11-321538 | 11/1999 |

(Continued)

*Primary Examiner*—Ruth Ilan
(74) *Attorney, Agent, or Firm*—Oliff & Berridge, PLC

(57) ABSTRACT

In a head portion protecting air bag apparatus in which an air bag (11) housed along a roof side rail (21) is inflated and deployed in a curtain-like shape along a vehicle compartment side wall by a gas supplied from an inflator (14) so as to protect a head portion of an occupant, the air bag (11) is provided with a front seat inflating portion (11c), a rear seat inflating portion (11d), and a gas passage (11b) communicated with inflating chambers of both of these inflating portions (11c, 11d), a gas supply port (11a) for supplying the gas supplied from the inflator (14) downward is provided corresponding to the gas passage (11b), and an auxiliary inflating chamber (11e1) is provided corresponding to the gas supply port (11a).

40 Claims, 27 Drawing Sheets

FOREIGN PATENT DOCUMENTS

| | | |
|---|---|---|
| JP | A 2000-127885 | 5/2000 |
| JP | A 2000-127886 | 5/2000 |
| JP | A 2000-296751 | 10/2000 |
| JP | A 2000-296752 | 10/2000 |
| JP | A 2000-326816 | 11/2000 |
| JP | A 2001-505845 | 5/2001 |
| WO | WO 99/19173 | 4/1999 |
| WO | WO 99/59845 A1 * | 11/1999 |

* cited by examiner

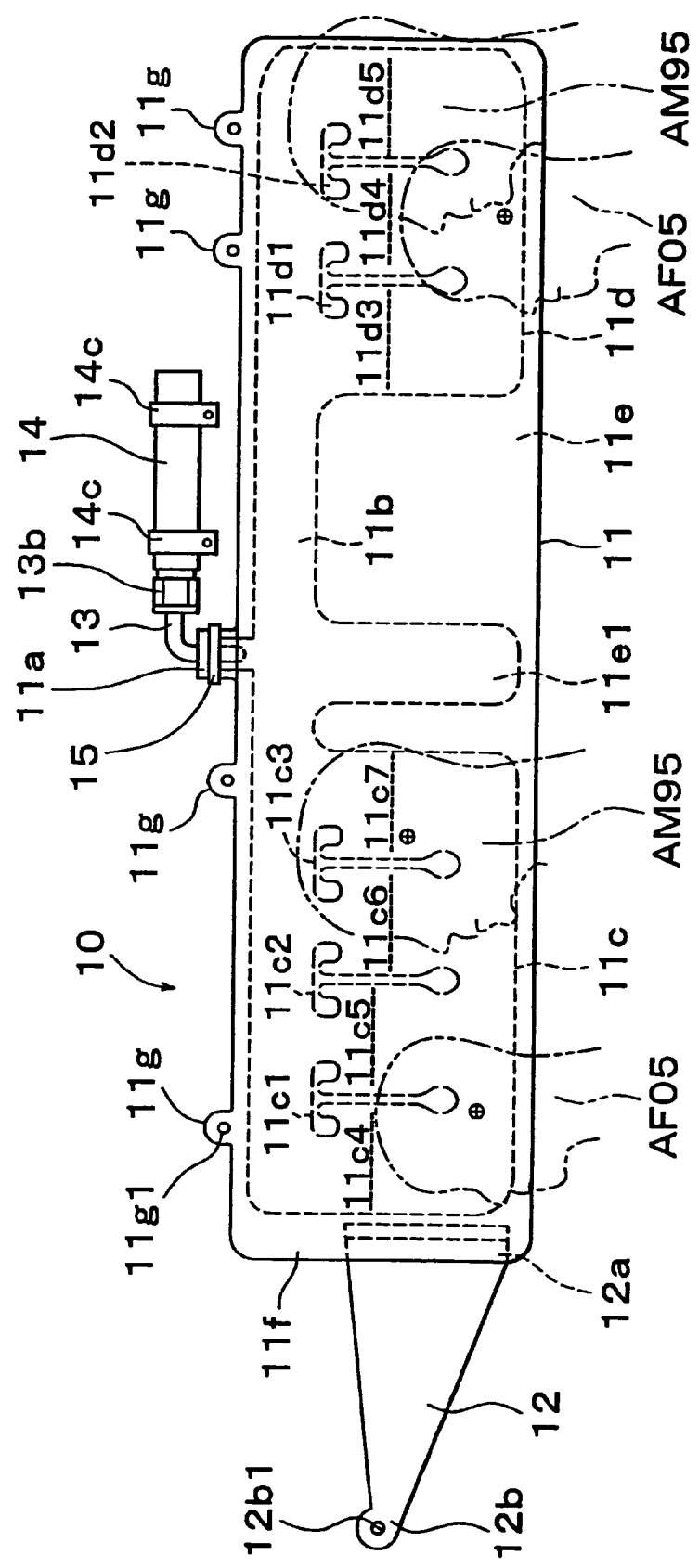

HEAD PORTION PROTECTING AIR BAG APPARATUS

FIELD OF THE INVENTION

The present invention relates to a head portion protecting air bag apparatus equipped in a vehicle, and more particularly to a head portion protecting air bag apparatus structured such that an air bag housed along a roof side rail inflates and deploys in a curtain-like shape along a side wall of a vehicle compartment by a gas supplied from an inflator so as to protect a head portion of an occupant.

BACKGROUND OF THE INVENTION

This kind of head portion protecting air bag apparatus includes, for example, a structure in which an inner tube is internally provided along a gas passage (an inflow portion) of an air bag so as to restrict bag damage by the gas supplied to an air bag from the inflator, as disclosed in Japanese Patent Application Laid-Open No. 11-321536, and a structure in which a tubular body is provided along a gas passage of an air bag so as to restrict bag damage applied by a gas supplied to the air bag from an inflator, for example, as disclosed in Japanese Patent Application Laid-Open Nos. 11-301394 and 2000-127886.

In the conventional head portion protecting air bag apparatus mentioned above, since the inner tube or the tubular body (a protecting member) mentioned above is provided in the gas passage of the air bag so as to restrict the bag damage due to the gas supplied to the air bag from the inflator, there is a risk that the inner tube or the tubular body mentioned above prevents the air bag from being folded so as to make it more difficult to house the air bag in the vehicle and cause a cost increase of the air bag apparatus.

On the contrary, in the air bag apparatus, it is necessary to satisfy various requirements in view of inflating and deploying performance of the air bag (a requirement of making a time after starting inflation and deployment until completing inflation and deployment equal to or less than a set time, a requirement of maintaining an initial internal pressure after starting inflation and deployment until completing inflation and deployment equal to or more than a high set pressure, a requirement of maintaining an internal pressure equal to or more than a low set pressure for a predetermined time after an initial predetermined time has elapsed after completing inflation and deployment, and the like).

In order to reduce the time for completing inflation and deployment of the air bag and increase the initial internal pressure, there is generally employed a countermeasure of increasing a gas supplying capacity of the inflator. However, when increasing the gas supplying capacity of the inflator, the bag damage is increased and it is impossible to increase a time of holding the internal pressure. Accordingly, it is necessary to sufficiently apply a coating for keeping airtightness, for example, onto a surface of the air bag so as to restrict bag damage and increase airtight performance, or it is necessary to increase a gas supply capacity of the inflator in addition to increasing airtight performance of the air bag, and there is a problem that improving the inflating and deploying performance of the air bag and reducing a cost reduction is contradictive. Such a problem can be solved by restricting bag damage of the air bag by a means capable of being realized at a low cost.

DISCLOSURE OF THE INVENTION

In accordance with a first aspect of the present invention, there is provided a head portion protecting air bag apparatus in which an air bag housed along a roof side rail is inflated and deployed in a curtain-like shape along a vehicle compartment side wall by a gas supplied from an inflator so as to protect a head portion of an occupant, in which the air bag is provided with a front seat inflating portion, a rear seat inflating portion, and a gas passage communicated with inflating chambers of both of these inflating portions, a gas supply port for supplying the gas supplied from the inflator downward (may also be obliquely downward) toward an inner portion of a vehicle compartment is provided corresponding to the gas passage, and an auxiliary inflating chamber is provided corresponding to the gas supply port.

In the head portion protecting air bag apparatus in accordance with the first aspect mentioned above, at a normal time, the air bag is accommodated along the roof side rail in a folded state, the gas is supplied from the inflator within the air bag at a time when the vehicle side is impacted or during a roll over or the like, and the air bag inflates and deploys in a curtain-like shape along a side wall of a vehicle compartment. At this time, the air bag inflates and deploys toward a head portion protecting area positioned at a side portion of the head portion of the occupant due to the gas supplied from the inflator.

In this case, in accordance with the first aspect, the gas supplied to the gas passage from the inflator through the gas supply port flows to the auxiliary inflating chamber, thereafter is supplied to the front seat inflating portion and the rear seat inflating portion through the gas supply portion in a divided manner, and flows to the auxiliary inflating chamber, whereby the gas pressure applied to the air bag is dispersed. Accordingly, a part of the gas passage in the air bag (the portion opposing the gas supply port) is not exposed to a great load due to the supply gas, whereby it is possible to restrict bag damage in the corresponding portion. Accordingly, it is possible to simplify a countermeasure applied to the gas passage of the air bag (a countermeasure against the gas pressure), it is possible to easily fold up the air bag compact, it is possible to make it easier to house the air bag to the vehicle and it is possible to reduce a cost of the air bag.

Further, the gas is supplied downward to the gas supply port of the air bag from the inflator and the gas is supplied to the auxiliary inflating chamber, whereby the gas passage expands in a vertical direction. Accordingly, an effective passage area in the gas passage of the air bag can be sufficiently secured, whereby a flow of the gas in a longitudinal direction (the gas flow to the front seat inflating portion and the rear seat inflating portion) is improved, it is possible to improve a gas supply performance in the gas passage, and it is possible to improve the inflating and deploying performance of the air bag.

In the first aspect mentioned above, the inflating chambers of the front seat inflating portion and the rear seat inflating portion are sectioned into a plurality of sections, whereby it is possible to set a capacity of the auxiliary inflating chamber to be smaller than a capacity of each of the sectioned inflating chambers. Accordingly, it is possible to obtain a restricting effect of the bag damage mentioned above in a state in which an increase of the deploying time of the air bag applied by the auxiliary inflating chamber has been greatly restricted.

Further, it is possible to structure the auxiliary inflating chamber so that it extends substantially downward. In accordance with this structure, it is possible to promote the downward inflation and deployment of the air bag as a whole due to the downward inflation and deployment of the auxiliary inflating chamber, and it is possible to reduce the inflating and deploying time of the air bag.

Further, in each of the aspects mentioned above, the structure can be made such that the auxiliary inflating chamber can be independently formed. In accordance with this structure, a function of the auxiliary inflating chamber can be sufficiently independently achieved.

Further, the structure can be made such that the auxiliary inflating chamber is communicated with the inflating chamber of the front seat inflating portion or the rear seat inflating portion at a lower end. In accordance with this structure, it is possible to promote inflation and deployment of the inflating chamber with which the auxiliary inflating chamber is communicated.

Further, the structure can be made such that the auxiliary inflating chamber is formed in a substantially cylindrical shape in the inflating and deploying state. In accordance with this structure, it is possible to stably obtain a downward force obtained by the gas supplied within the auxiliary inflating chamber, and it is possible to stabilize a motion during inflating and deploying the air bag.

Further, the structure can be made such that the auxiliary inflating chamber is arranged close to the front seat inflating portion or the rear seat inflating portion. In accordance with this structure, it is possible to utilize the auxiliary inflating chamber as the inflating chamber of the front seat inflating portion or the rear seat inflating portion, and it is possible to sufficiently secure the head portion protecting area.

Further, in the aspect mentioned above, the structure can be made such that the gas supply port and the auxiliary inflating chamber are set in the gas passage between the front seat inflating portion and the rear seat inflating portion. In accordance with this structure, it is possible to supply the gas to the respective inflating chambers of the front seat inflating portion and the rear seat inflating portion at substantially the same timing, it is possible to reduce the time from starting inflation and deployment of the air bag until completion, and it is possible to improve the motion during inflating and deploying the air bag.

Further, the structure can be made such that the rear seat inflating portion is constituted by an expanding portion for a rear seat front line-row and an expanding portion for a rear seat rear row. in accordance with this structure, it is possible to realize as a head portion protecting air bag apparatus for a vehicle having three rows of seats including two rows of rear seats.

Further, the structure can be made such that the auxiliary inflating chamber is arranged in an area corresponding to a pillar. In accordance with this structure, the auxiliary inflating chamber can also function as a head portion protecting inflating chamber corresponding to the pillar.

Further, the structure can be made such that the inflator is arranged in a center portion in a longitudinal direction of the vehicle. In accordance with this structure, it is possible to reduce a length of the gas flow passage from the inflator to the inflating chambers of the front seat inflating portion and the rear seat inflating portion, and it is possible to reduce the inflating and deploying time of the air bag.

Further, the inflator arranged in the center portion in the longitudinal direction of the vehicle may be arranged in a longitudinal direction along the roof side rail above the air bag, or may be arranged in a vehicle width direction along the roof panel above the air bag. In accordance with this structure, there is a high degree of freedom of mounting the inflator.

Further, in the first aspect mentioned above, the structure can be made such that the gas supplied from the inflator is supplied to the gas supply port of the air bag via the diffuser pipe. In accordance with this structure, supplying the gas to the gas supply port of the air bag is made by a shape of the diffuser pipe, and it is possible to increase the degree of freedom of mounting of the inflator to the vehicle.

Further, the structure can be made such that a front end portion extending below the diffuser pipe is arranged substantially parallel to a side glass surface. In accordance with this structure, it is possible to inflate and deploy the air bag along the side glass surface.

Further, the structure can be made such that gas flow dispersing means for dispersing the gas flow is provided in the gas supply port. In accordance with this structure, it is possible to expect a synergetic effect of a gas flow dispersing action obtained by the gas flow dispersing means and a gas pressure dispersing action obtained by the gas flow into the auxiliary inflating chamber, and it is possible to effectively restrict the bag damage.

Further, the structure can be made such that the gas flow dispersing means is constituted by a shower head provided in a front end portion of the diffuser pipe. In accordance with this structure, it is possible to easily change and set a dispersing performance by changing an aspect of the shower head.

Further, in accordance with the first aspect mentioned above, in the case that the auxiliary inflating chamber can be independently formed in the air bag, it is possible to set a ratio between a front portion effective cross sectional area of the gas passage for communicating the gas supply port with the inflating chamber of the front seat inflating portion and a rear portion effective cross sectional area of the gas passage for communicating the gas supply port with the inflating chamber of the rear seat inflating portion, according to a ratio of the capacity of the inflating chamber between the front seat inflating portion and the rear seat inflating portion. In accordance with this structure, it is possible to distribute and supply the gas to the respective inflating chambers in the front seat inflating portion and the rear seat inflating portion in accordance with the ratio of the capacity of the inflating chamber between the front seat inflating portion and the rear seat inflating portion, and it is possible to substantially simultaneously complete inflation and deployment of the front seat inflating portion and the rear seat inflating portion.

Further, in accordance with the first aspect mentioned above, in the case that the auxiliary inflating chamber is communicated with the inflating chamber of the front seat inflating portion or the rear seat inflating portion, it is possible to set a ratio between a sum of an effective cross sectional area of a passage for communicating a lower end of the auxiliary inflating chamber with the inflating chamber of the front seat inflating portion or the rear seat inflating portion, and an effective cross sectional area of the gas passage on a communication side for communicating the inflating chamber of the front seat inflating portion or the rear seat inflating portion having an inflating chamber communicating with the lower end of the auxiliary inflating chamber with the gas supply port, and an effective cross sectional area of the gas passage on a non-communication side, in correspondence with a ratio of the capacity of the inflating chamber between the front seat inflating portion and the rear seat inflating portion. In accordance with this structure, it is possible to distribute and supply the gas to the respective inflating chambers in the front seat inflating portion and the rear seat inflating portion corresponding to the ratio of the capacity of the inflating chamber between the front seat inflating portion and the rear seat inflating portion, and it is possible to substantially simultaneously complete inflation and deployment of the front seat inflating portion and the rear seat inflating portion.

Further, in accordance with the first aspect mentioned above, the structure can be made such that the front end portion of the auxiliary inflating chamber is communicated with the lower ends of the respective inflating chambers in the front seat inflating portion and the rear seat inflating portion. In accordance with this structure, since the gas supplied to the auxiliary inflating chamber is supplied to the lower ends of the respective inflating chambers in the front seat inflating portion and the rear seat inflating portion, it is possible to reduce a time required for completing the deployment of the air bag to the lower end while restricting the bag damage.

Further, it is possible to set a ratio between a sum of an effective cross sectional area of a passage for communicating a front end portion of the auxiliary inflating chamber with a lower end of the inflating chamber of the front seat inflating portion and a front portion effective cross sectional area of the gas passage for communicating the gas supply port with the inflating chamber of the front seat inflating portion, and a sum of an effective cross sectional area of a passage for communicating the front end portion of the auxiliary inflating chamber with the lower end of the inflating chamber of the rear seat inflating portion and a rear portion effective cross sectional area of the gas passage for communicating the gas supply port with the inflating chamber of the rear seat inflating portion, in correspondence with a ratio of the capacity of the inflating chamber between the front seat inflating portion and the rear seat inflating portion. In accordance with this structure, it is possible to substantially simultaneously complete inflation and deployment of the front seat inflating portion and the rear seat inflating portion while restricting the bag damage and reduce the time required for completing the deployment of the air bag to the lower end thereof.

Further, in the case of communicating the front end portion of the auxiliary inflating chamber with the lower ends of the respective inflating chambers of the front seat inflating portion and the rear seat inflating portion, the structure can be made such that a sum of an effective cross sectional area of a passage for communicating the front end portion of the auxiliary inflating chamber with the lower end of the inflating chamber of the front seat inflating portion and an effective cross sectional area of a passage for communicating the front end portion of the auxiliary inflating chamber with the lower end of the inflating chamber of the rear seat inflating portion is set to be equal to or less than an effective cross sectional area functioning as a passage of the auxiliary inflating chamber. In accordance with this structure, it is possible to sufficiently secure the gas pressure even at the front end portion of the auxiliary inflating chamber, it is possible to accurately supply the gas to the lower ends of the respective inflating chambers in the front seat inflating portion and the rear seat inflating portion from the front end portion of the auxiliary inflating chamber, and it is possible to obtain a desired air bag deploying performance.

Further, in the first aspect mentioned above, the structure can be made such that the inflating chambers extending in the vertical direction of the front seat inflating portion and the rear seat inflating portion in the air bag are set in an area not overlapping with a pillar garnish. In accordance with this structure, since the inflating chambers extending in the vertical direction of the front seat inflating portion and the rear seat inflating portion do not overlap with the pillar garnish and the deploying resistance is not increased, it is possible to improve a deploying property of the air bag and it is possible to reduce the time required for completing the deployment of the air bag.

Further, the structure can be made such that the inflating chambers extending in the vertical direction of the air bag close to the front or rear pillar garnish is formed so as to expand a lower area forward or rearward. In accordance with this structure, since the inflating chambers extending in the vertical direction of the front seat inflating portion and the rear seat inflating portion do not overlap with the pillar garnish and the deploying resistance is not increased, it is possible to improve the deploying property of the air bag and it is possible to reduce the time required for completing the deployment of the air bag, whereby it is possible to expand a head portion protecting area (improve a head portion protecting performance).

Further, in the first aspect mentioned above, the structure can be made such that the gas passage is formed along an upper edge portion of the air bag and an effective cross sectional area of the gas passage is reduced toward at least one of the front end portion and the rear end portion thereof. In accordance with this structure, in the gas passage formed along the upper edge portion of the air bag, it is possible to sufficiently secure the gas pressure in at least one of the front end portion and the rear end portion of the gas passage, it is possible to accurately supply the gas to the corresponding respective inflating chambers from the gas passage, it is possible to improve the deploying property of the air bag, and it is possible to reduce the time required for completing the deployment of the air bag.

Further, the structure can be made such that a lower end line of the gas passage is formed so as to be upwardly inclined toward at least one of the front end portion and the rear end portion. In accordance with this structure, it is possible to oppose the upper end opening of the inflating chamber formed corresponding to at least one of the front end portion and the rear end portion in the gas passage to the gas flow flowing through the gas passage in an inclined state, whereby it is possible to increase the gas supply efficiency of the corresponding inflating chamber so as to improve the deploying performance of the air bag.

Further, when the front end portion of the auxiliary inflating chamber is communicated with the lower ends of the respective inflating chambers in the front seat inflating portion and the rear seat inflating portion, the structure can be made such that the gas passages for respectively communicating the front end portion of the auxiliary inflating chamber with the lower ends of the respective inflating chambers in the front seat inflating portion and the rear seat inflating portion is set so that an effective cross sectional area of the passage is reduced toward at least one of the front end portion and the rear end portion. In accordance with this structure, in the gas passage for respectively communicating the auxiliary inflating chamber with the lower ends of the respective inflating chambers in the front seat inflating portion and the rear seat inflating portion, it is possible to sufficiently secure the gas pressure in at least one of the front end portion and the rear end portion of the gas passage, it is possible to accurately supply the gas to the corresponding respective inflating chambers from the gas passage, it is possible to improve the deploying property of the air bag, and it is possible to reduce the time required for completing the deployment of the air bag.

Further, in the first aspect mentioned above, the structure can be made such that a cross sectional area of the auxiliary inflating chamber is set so as to be reduced toward the lower front end. In accordance with this structure, it is possible to reduce a time required for charging the gas into the auxiliary inflating chamber while restricting the bag damage. It is possible to increase a deploying speed of the auxiliary inflating chamber so as to further reduce the time required for completing the deployment of the air bag.

Further, the structure can be made such that a diffusing nozzle connected to the inflator via a diffuser pipe, for diffusing the gas in the longitudinal direction at a predetermined angle, is provided so as to face the gas supply port and the gas supply port is formed in a shape expanding toward the gas passage in the longitudinal direction at an angle equal to or more than an angle of diffusion of the diffusing nozzle. In accordance with this structure, it is possible to restrict the gas injected from the diffusing nozzle from being injected to the gas supply port forming portion of the air bag, and it is possible to effectively diffuse and supply the gas to both of the front and rear portions of the gas passage and the auxiliary inflating chamber while reducing the damage of the gas supply port forming portion in the air bag.

Further, the structure can be made such that a non-expanded portion is formed continuous with the expanded portion of the gas supply port, and the air bag and the diffuser pipe are clamped and fixed in the non-expanded portion. In accordance with this structure, it is possible to clamp and fix the air bag and the diffuser pipe without negatively affecting the expanded portion of the air bag, it is possible to accurately secure the expanded portion of the air bag, and it is possible to securely obtain an effect of effectively diffusing and supplying the gas to both of the front and rear portions of the gas passage and the auxiliary inflating chamber.

Further, in the first aspect mentioned above, the structure can be made such that a diffusing nozzle connected to the inflator via a diffuser pipe, for diffusing the gas at a predetermined angle, is provided so as to face the gas supply port and the gas is injected farther forward than a radial end point in front of the upper end of the auxiliary inflating chamber and farther rearward than radial end point at the rear of the upper end. In accordance with this structure, it is possible to well distribute the gas to the forward portion and the rearward portion of the gas passage in a state the bag damage is reduced and an inflow of the gas to the auxiliary inflating chamber is secured, and it is possible to improve a property of distributing the gas from the diffusing nozzle in the forward, rearward, and downward directions.

Further, in the first aspect mentioned above, the structure can be made such that an adjusting throttle portion is set in an inflow port of the auxiliary inflating chamber. In accordance with this structure, it is possible to increase a gas pressure in an upstream of the adjusting throttle portion, and it is possible to secure the gas pressure flowing into the auxiliary inflating chamber, so that even if the auxiliary inflating chamber is arranged at a position interfering with the B pillar garnish, the auxiliary inflating chamber rides over the B pillar garnish so as to inflate and deploy.

Further, the structure can be made such that an inflating chamber in a longitudinal direction horizontally crossing an interior side of a vehicle body structuring member such as a pillar, a division bar or the like during inflating and deploying is set in the lower end portion of the air bag. In accordance with this structure, it is possible to restrict a movement of the occupant toward an exterior side so as to improve an occupant restricting performance due to a collaborative effect among the inflating chamber in the longitudinal direction set in the lower end portion of the air bag, and the pillar and the division bar existing in the exterior side thereof.

Further, the structure can be made such that the inflating chamber in the longitudinal direction set in the lower end of the air bag is formed by expanding a lower end portion of an independent inflating chamber extending in the vertical direction and communicated with the gas passage at an upper end in the longitudinal direction. In accordance with this structure, even in the air bag in which the front seat inflating portion and the rear seat inflating portion are constituted by a plurality of independent inflating chambers extending in the vertical direction and communicated with the gas passage at the upper end, it is possible to obtain the same effect as that of the preferred form as mentioned in the preceding paragraph.

Further, in the first aspect mentioned above, a balancer chamber protruding to at least one of the forward portion and the rearward portion is set in a middle portion in the vertical direction of the auxiliary inflating chamber. In accordance with this structure, it is possible to apply a tension to a portion close to the balancer chamber due to an extension of the balancer chamber, it is possible to restrict a flip-flop during deploying the air bag, and it is possible to well deploy the air bag even in a narrow deployment space.

Further, the structure can be made such that a deflecting chamber for applying a contractile force to a fabric portion between the front seat inflating portion and the rear seat inflating portion is set in the lower end of the auxiliary inflating chamber. In accordance with this structure, the contractile force (a tension) is applied to the fabric portion between the front seat inflating portion and the rear seat inflating portion due to the inflation of the deflecting chamber, thereby restricting the flip-flop of the fabric portion during deploying the air bag.

Further, in the first aspect mentioned above, the structure can be made such that a width of the forward portion of the gas passage for supplying the gas from the gas supply port to the front seat inflating portion is made substantially the same as a width of the rear portion of the gas passage for supplying the gas from the gas supply port to the rear seat inflating portion, and a vertical width of the gas passage is set to an integral multiple of a folding width at a time when the air bag is folded up in the vertical direction. In accordance with this structure, it is possible to coincide a bending end of the gas passage with an end of the bending width of the air bag, and it is possible to secure the bag deploying property.

Further, in the first aspect mentioned above, the structure can be made such that a vertical width of the forward portion of the gas passage for supplying the gas from the gas supply port to the front seat inflating portion is made different from a vertical width of the rearward portion of the gas passage for supplying the gas from the gas supply port to the rear seat inflating portion, and respective vertical widths of the forward portion and the rearward portion of the gas passage is set to an integral multiple of a folding width at a time when the air bag is folded up in the vertical direction. In accordance with this structure, it is possible to coincide the bending end of the gas passage with an end of the bending width of the air bag even when the vertical widths of the front and rear gas passages are different from each other, and it is possible to secure the bag deploying property.

Further, in the first aspect mentioned above, the structure can be made such that a diffusing nozzle connected to the inflator via a diffuser pipe, for diffusing the gas at a predetermined angle, is provided so as to face the gas supply port, an inclined portion expanding toward the lower portion is formed downwardly in the forward portion or the rearward portion of the gas supply port, and the air bag and the diffuser pipe are clamped and fixed in a state has been moved where the diffuser pipe close to the inclined portion. In accordance with this structure, it is possible to improve an assembling operability without deteriorating a gas distributing property provided by the diffusion nozzle.

Further, the structure can be made such that a diffusing nozzle connected to the inflator via a diffuser pipe, for diffusing the gas at a predetermined angle, in the longitudinal direction is provided so as to face the gas supply port, the gas supply port is formed in a shape expanding in the longitudinal direction at an angle equal to or more than an angle of diffusion of the diffusing nozzle toward the gas passage, and the air bag and the diffuser pipe are clamped and fixed in a state where the diffuser pipe has been moved close to the inclined portion. In accordance with this structure, it is possible to improve an assembling operability without deteriorating a gas distributing property provided by the diffusion nozzle.

Further, in the first aspect mentioned above, the structure can be made such that the front seat inflating portion and the rear seat inflating portion in the air bag are constituted by a plurality of inflating chambers, and the respective inflating chambers have upper ends provided so as to be inclined toward the gas supply port. In accordance with this structure, it is possible to move the upper ends of the respective inflating chambers constituting the front seat inflating portion and the rear seat inflating portion close to the gas supply port, it is possible to reduce a time required for supplying the gas to the respective inflating chambers, and it is possible to reduce a time required for completing inflation and deployment of the air bag.

Further, the structure can be made such that a lower end line of the gas passage is formed so as to be upwardly inclined toward the front end portion and the rear end portion. In accordance with this structure, it is possible to oppose the upper end openings of the respective inflating chambers to each other in a state of being inclined to the gas flow flowing through the gas passage, whereby it is possible to increase the gas supply efficiency of the respective inflating chambers and it is possible to further reduce a time until inflation and deployment of the air bag is completed.

Further, in the case that the auxiliary inflating chamber is communicated with the inflating chamber of the front seat inflating portion or the rear seat inflating portion, the structure can be made such that the inflating chamber of the front seat inflating portion or the rear seat inflating portion communicating with the lower end of the auxiliary inflating chamber is constituted by a plurality of chambers, and the respective inflating chambers extend in the vertical direction so as to be communicated with each other in both of the upper and lower end portions provided with a throttle. In accordance with this structure, it is possible to secure the gas pressure before flowing into both of the upper and lower end portions of the respective inflating chambers from the throttle provided in both of the upper and lower end portions of the respective inflating chambers, and it is possible to supply the gas to the respective inflating chambers from the upper and lower portions with a good balance.

BRIEF DESCRIPTION OF THE DRAWINGS

FIG. 2 is an enlarged side elevational view of an air bag module shown in FIG. 1;

DETAILED DESCRIPTION OF THE PREFERRED EMBODIMENTS

Figure 1:
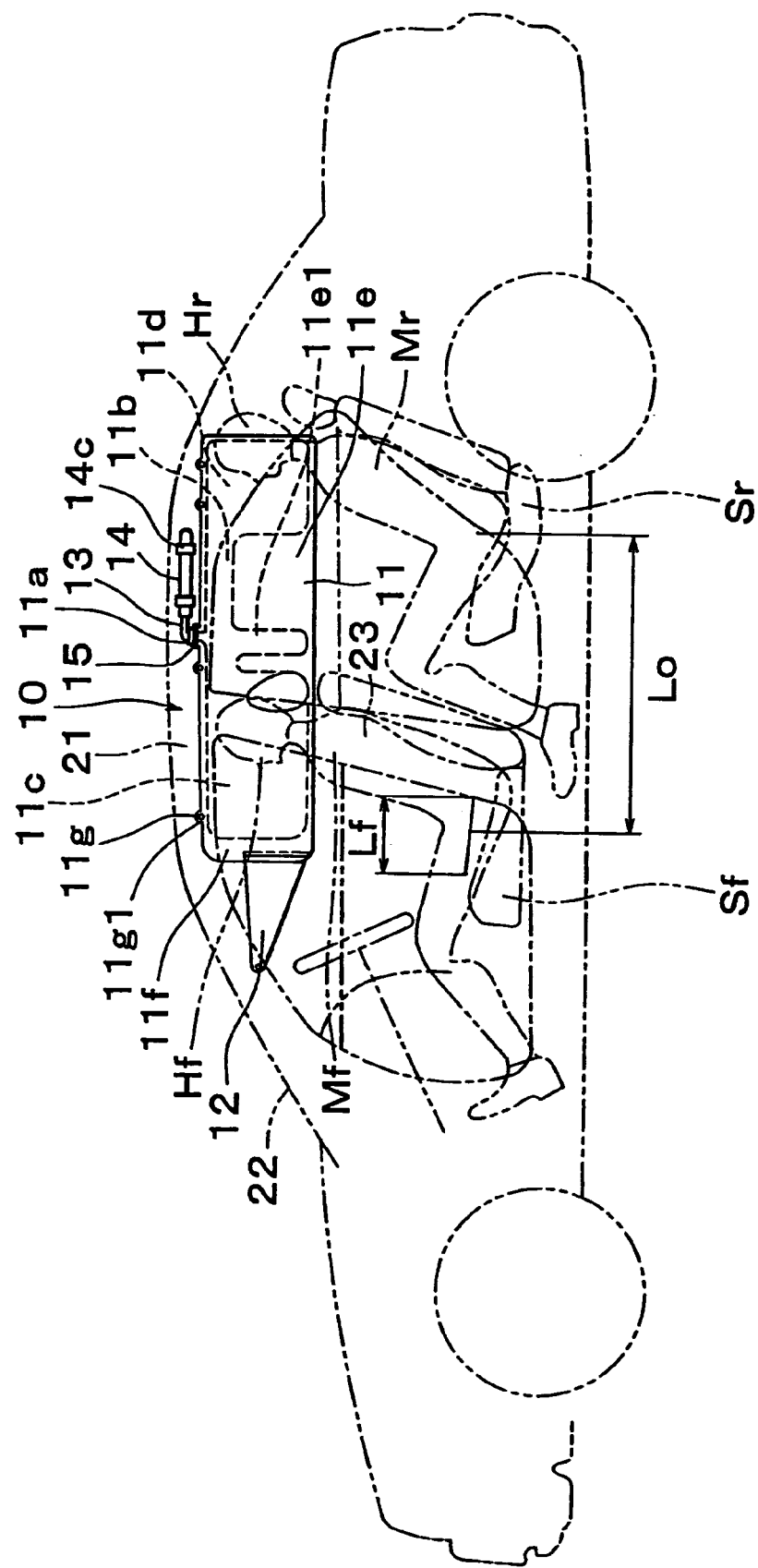
FIG. 1 is a side elevational view showing an embodiment where the present invention is applied to a head portion protecting air bag apparatus.

A description will be given below of an embodiment in accordance with the present invention with reference to the accompanying drawings. FIGS. 1 to 10 show an embodiment in which the present invention is applied to a head portion protecting air bag apparatus for an passenger car vehicle. The air bag apparatus in accordance with this embodiment is provided with an air bag module 10 constituted by an air bag 11 inflating and deploying in a curtain-like shape along a side wall of a vehicle compartment, a tension cloth 12 assembled in a front end portion of the air bag 11 and an inflator 14 assembled in an air tight manner in a gas supply port 11a of the air bag 11 together with a diffuser pipe 13.

The air bag 11 is formed in accordance with a double elastic webbing so that a direction of texture becomes longitudinally and vertically, has a coating for keeping airtightness applied to a surface thereof, has a gas supply port 11a extending in a vertical direction, a gas passage 11b extending in a longitudinal direction so as to substantially cross to a lower end thereof vertically, a front seat inflating portion 11c and a rear seat inflating portion 11d communicating with each other through the gas passage 11b, and has an intermediate non-expanding portion 11e, a front end non-expanding portion 11f and four mounting piece portions 11g. In this case, a mounting hole 11g1 to a roof side rail 21 is provided in each of the mounting piece portions 11g.

The front seat inflating portion 11c is structured, as shown in FIGS. 1 and 2, such as to protect a head portion Hf of an occupant Mf sitting on a front seat Sf (a seat arranged corresponding to a B pillar 23), and is sectioned into four inflating chambers (cells) 11c4, 11c5, 11c6 and 11c7 in an inner portion of a center thereof by three T-shaped sectioning portions (non-expanding portions) 11c1, 11c2 and 11c3 provided in the center in a vertical direction, and the respective inflating chambers 11c4 to 11c7 are communicated with each other at both upper and lower ends at substantially the same capacity.

The rear seat inflating portion 11d is structured, as shown in FIGS. 1 and 2, such as to protect a head portion Hr of an occupant Mr sitting on a rear seat Sr, and is sectioned into three inflating chambers (cells) 11d3, 11d4 and 11d5 in an inner portion of a center thereof by two T-shaped sectioning portions (non-expanding portions) 11d1 and 11d2 provided in the center in a vertical direction, and the respective inflating chambers 11d3 to 11d5 are communicated with each other at both upper and lower ends at substantially the same capacity.

The intermediate non-expanding portion 11e is provided between the front seat inflating portion 11c and the rear seat inflating portion 11d, and an auxiliary inflating chamber 11e1 is formed at a middle portion thereof. The auxiliary inflating chamber 11e1 is provided corresponding to the gas supply port 11a, and extends downward from a lower end of a middle portion of the gas passage 11b, and a capacity thereof is set to be smaller than a capacity of each of the inflating chambers (the cells) 11c4, 11c5, 11c6 and 11c7 in the front seat inflating portion 11c and each of the inflating chambers (the cells) 11d3, 11d4 and 11d5 in the rear seat inflating portion 11d. Further, the auxiliary inflating chamber 11e1 is independently formed from each of the inflating chambers (the cells) 11c4, 11c5, 11c6 and 11c7 in the front seat inflating portion 11c and each of the inflating chambers (the cells) 11d3, 11d4 and 11d5 in the rear seat inflating portion 11d, and is set to be formed in a substantially cylindrical shape in an inflating and deploying state.

The tension cloth 12 is formed in a triangle shape (a shape can be suitably changed) by a non-coat woven fabric which is thinner and more inexpensive than the cloth constructing the air bag 11, is sewn up in a front end non-expanding portion 11f of the air bag 11 at a rear end portion 12a, and is structured such as to be assembled in an A pillar 22 by a mounting hole 12b1 provided in the front end portion 12b (refer to FIG. 1).

Figure 5:
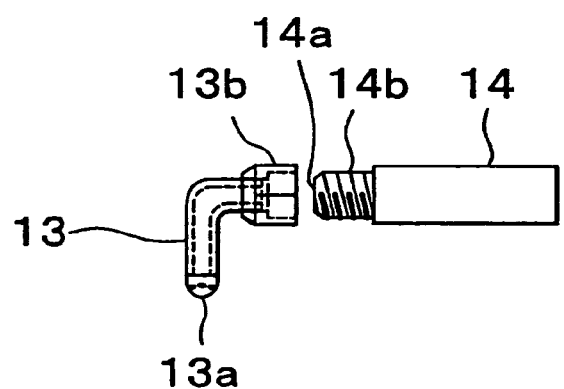
FIG. 5 is a side elevational view of a diffuser pipe and an inflator shown in FIG. 2.
Figure 9:
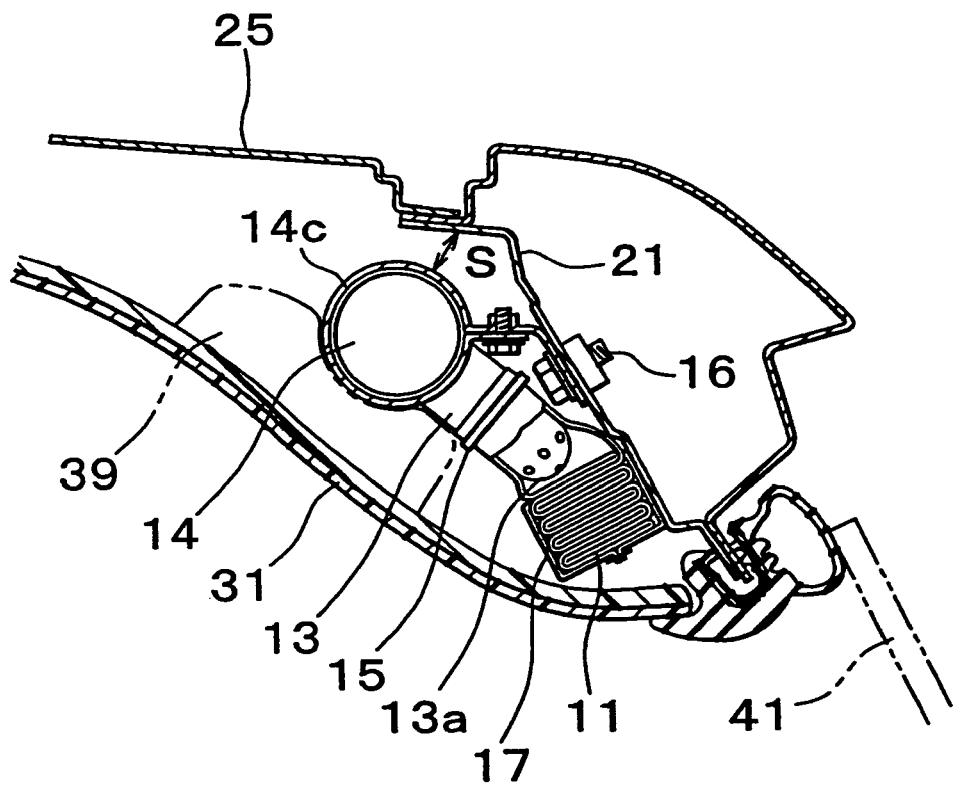
FIG. 9 is an enlarged vertical cross sectional back view obtained by vertically cross sectioning the air bag shown in FIGS. 1 and 2 farther rearward than the inflator in a state where the air bag is folded and housed.

The diffuser pipe 13 is, as shown in FIGS. 2, 5 and 9, formed in a thin and substantially J shape, is assembled in an air tight manner in the gas supply port 11a of the air bag 11 by using a fastening band 15 in a state of being integrally connected and fixed in an air tight manner to a male screw portion 14b provided in a gas injection port 14a of the inflator 14 by using a flare nut 13b, has a diameter smaller than that of the gas supply port 11a and is set so that a desired gap is formed between the gas supply port 11a and the diffuser pipe 13. This gap corresponds to a gap allowing a gas radial injection at a front end of the diffuser pipe 13.

Further, the diffuser pipe 13 is arranged, as shown in FIG. 1, so that a front end thereof is directed obliquely downward along a side glass (a door glass) surface 41 (so as to be substantially parallel to the side glass surface 41) as shown in FIG. 9, at a position a little rearward rather than the B pillar 23, and is structured such as to supply the gas so as to cross to the gas passage 11b extending in a longitudinal direction of the air bag 11 from the above.

Further, a shower head 13a for dispersing (diffusing) the gas flow (the gas stream) supplied from the inflator 14 in a three-dimensional direction (a radial direction) is integrally provided in a front end of the diffuser pipe 13 (a gas injection port of the diffuser pipe 13), that is, a portion facing to the gas passage 11b of the air bag 11, and a length of a front end portion in the diffuser pipe 13 is set so that the shower head 13a does not protrude out within the gas passage 11b of the air bag 11.

Figure 6:
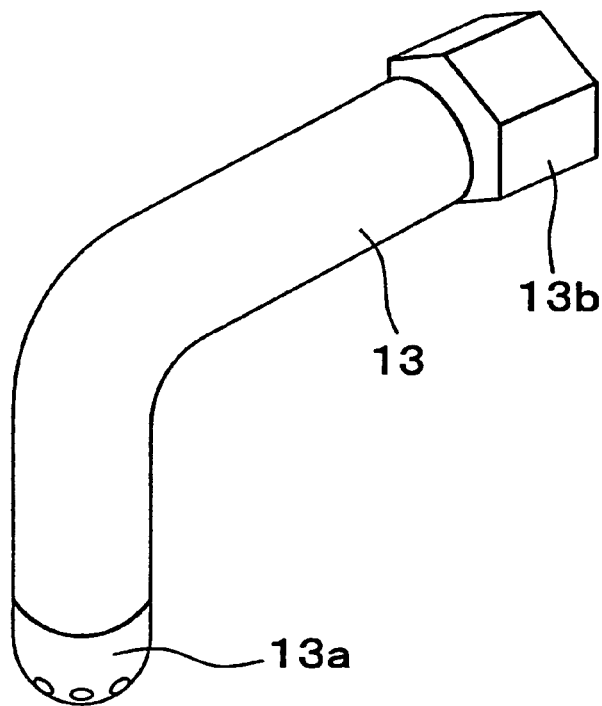
FIG. 6 is an enlarged perspective view of the diffuser pipe and a shower head shown in FIGS. 2 and 5.
Figure 7:
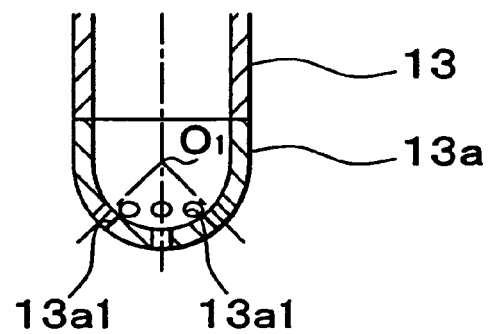
FIG. 7 is an enlarged vertical cross sectional view of the shower head shown in FIG. 6.
Figure 8:
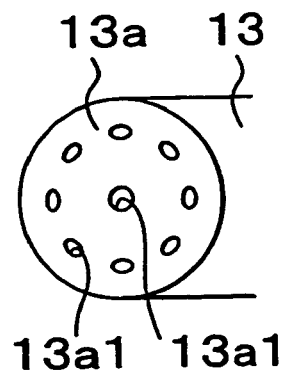
FIG. 8 is a bottom elevational view of the shower head shown in FIG. 7.

The shower head 13a has, as shown in FIGS. 6 to 8 in a detailed manner, a function of dispersing the gas supplied to the air bag 11 from the inflator 14 through the diffuser pipe 13 in a three-dimensional direction, and is formed in a substantially semispherical shape by a metal raw material, and a plurality of injection holes 13a1 radially extending from a center O1 of a spherical surface thereof are provided on the spherical surface in symmetrical with respect to a point of a center (axis) of the shower head 13a.

A plurality of injection holes 13a1 are constituted by an injection hole provided in a center of the front end and eight injection holes provided at a uniform interval in a circumferential direction above the injection hole, and eight injection holes and the injection hole in the center of the front end have the same diameter. In this case, eight injection holes provided at the uniform interval in the circumferential direction may be employed so as to have a diameter larger (or smaller) than the injection hole in the center of the front end. Further, the shower head 13a also serves as a flow changing means for changing a flow of the gas supplied from the inflator 14, and further serves as a flow dividing means for dividing the flow of the gas supplied from the inflator 14 into a plurality of sections.

The inflator 14 is structured such as to inject and supply the gas toward the air bag 11 at a time when the vehicle side is impacted or during a roll over of the vehicle, and is assembled in a roof side rail 21 by a bracket 14c with using a bolt 16 or the like, as shown in FIG. 9. Further, the inflator 14 is arranged in a longitudinal direction along the roof side rail 21 above the air bag 11 in a center portion in the longitudinal direction of the vehicle, and is structured such as to be covered by a roof head lining 31. In this case, the bracket 14c shown in FIG. 9 corresponds to a bracket (an EA bracket) formed by a raw material (an energy absorbing raw material) which can be easily plastically deformed against an external force, and can absorb an energy at a stroke S until being brought into contact with the roof side rail 21. In the case that an amount of energy is a lot, it is possible to attach an energy absorbing pad 39 onto a back surface of the roof head lining 31, as shown by a virtual line.

In the air bag apparatus in accordance with the embodiment structured in the manner mentioned above, at a normal time, the air bag 11 and the tension cloth 12 are accommodated along the A pillar 22 and the roof side rail 21 in a state that they are fold up in a multiplicity of layers in the vertical direction and are accommodated in a breakable bag 17 (refer to FIGS. 9 and 10) in a compact manner, and are covered by an A pillar garnish (not shown) and the roof head lining 31.

Figure 10:
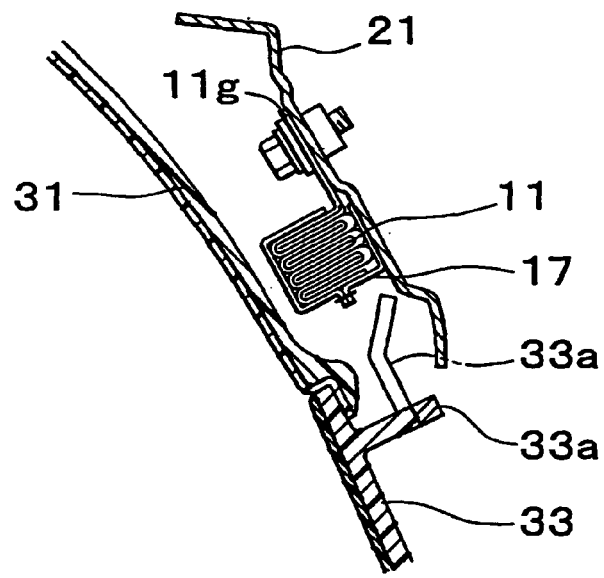
FIG. 10 is an enlarged vertical cross sectional back view obtained by vertically cross sectioning the air bag shown in FIGS. 1 and 2 at a B pillar portion in a state where the air bag is folded and housed.

FIG. 10 shows a cross section in a B pillar garnish 33 portion. A projection 33a for preventing the inflating and deploying air bag 11 from entering into a back portion of the B pillar garnish 33 is formed on a back surface of an upper portion in the B pillar garnish 33. In this case, the projection 33a may be employed by a shape shown by a virtual line in FIG. 10 (a shape having an inclined surface in an upward bent portion), and in this case, inflation and deployment of the air bag 11 is guided by the inclined surface so as to prevent the air bag 11 from being caught on an upper end of the B pillar garnish 33.

Further, at a time when the vehicle side is impacted or during a roll over or the like of the vehicle, if the gas is injected out from the inflator 14 and the gas is supplied downward to the gas passage 11b of the air bag 11 from the shower head 13a through the diffuser pipe 13, the air bag 11 deforms the corresponding portion of the roof head lining 31 toward the inner portion of the vehicle compartment so as to deploy downward, and the tension cloth 12 deforms the corresponding portion of the A pillar garnish toward the inner portion of the vehicle compartment so as to deploy downward, whereby the air bag 11 inflates and deploys in the curtain-like shape along the side wall within the vehicle compartment as shown in FIG. 1.

At this time, the gas flows from the gas passage 11b of the air bag 11 to the auxiliary inflating chamber 11e1, and the gas flows from the gas passage 11b of the air bag 11 to the respective inflating chambers (the cells) 11c4, 11c5, 11c6 and 11c7 in the front seat inflating portion 11c and the respective inflating chambers (the cells) 11d3, 11d4 and 11d5 in the rear seat inflating portion 11d, and the respective expanding portions 11c and 11d of the air bag 11 inflate and deploy toward a head portion protecting area positioned in side portions of the head portions Hf and Hr of the respective passengers Mf and Mr.

Figure 3A:
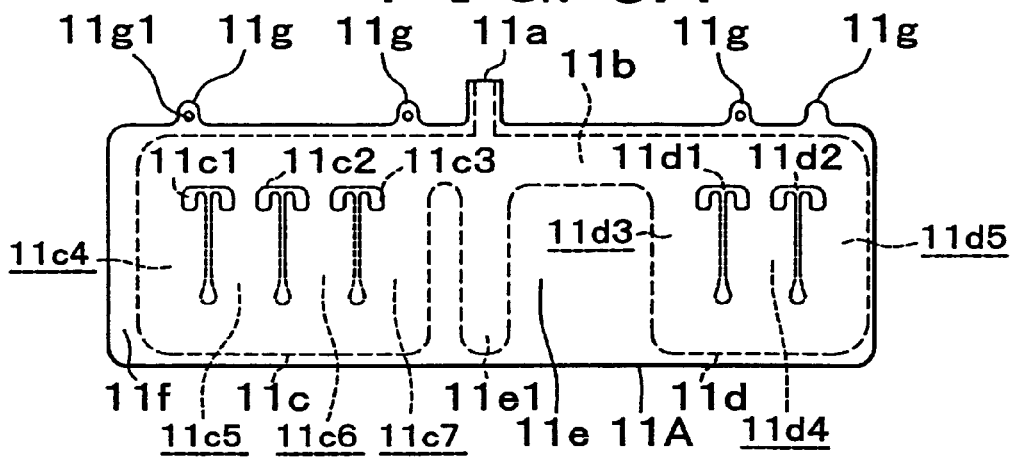
FIGS. 3A to 3C are side elevational views of three kinds of air bags including an air bag shown in FIG. 2.
Figure 3B:
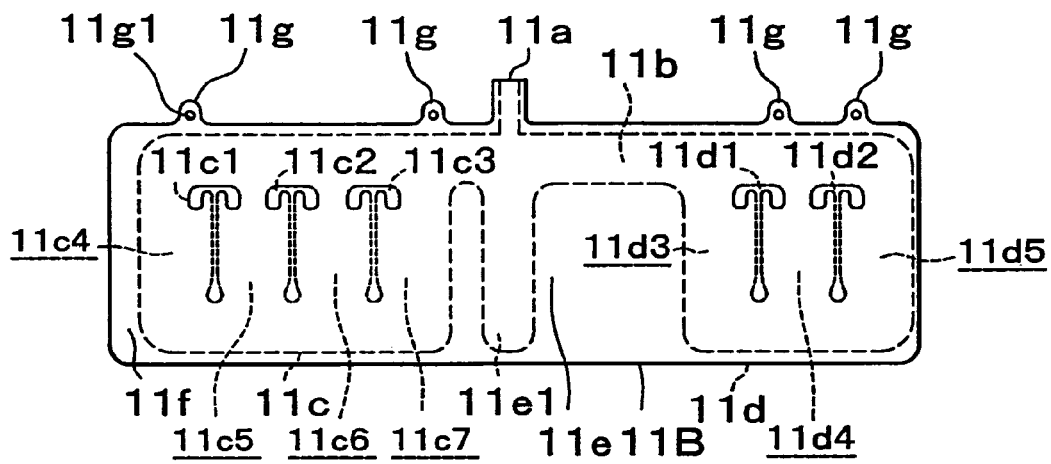
Figure 3C:
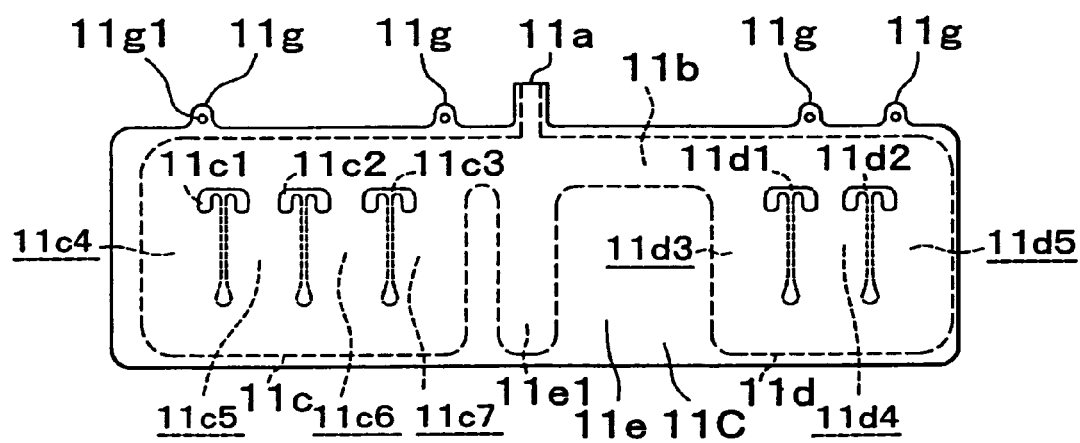
Figure 4A:
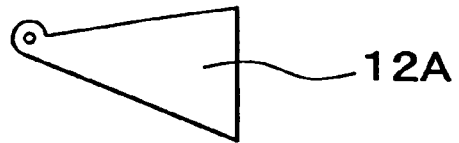
FIGS. 4A to 4C are side elevational views of three kinds of tension clothes including a tension cloth shown in FIG. 2.
Figure 4B:
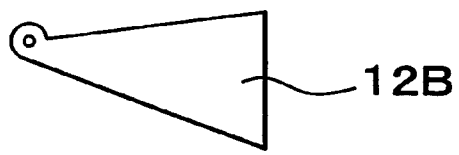
Figure 4C:
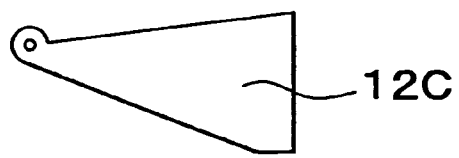

In this case, in this embodiment, one corresponding to the vehicle is selected as the air bag 11 constituting the air bag module 10 among three kinds of air bag 11A, 11B and 11C shown in FIGS. 3A to 3C, one corresponding to the vehicle is selected as the tension cloth 12 among three tension cloths 12A, 12B and 12C shown in FIGS. 4A to 4C, and the air bag 11 and the tension cloth 12 are combined with a single kind of diffuser pipe 13 (provided with the shower head 13a at the front end) shown in FIG. 5 and the inflator 14, whereby the air bag module 10 is constructed.

Three kinds of air bags 11A, 11B and 11C shown in FIGS. 3A to 3C are sorted on the basis of a distance between the front and rear seats in all the kinds of passenger cars (accurately, as shown in FIG. 1, a distance Lo between hip points of the occupants Mf and Mr sitting on the front and rear seats Sf and Sr existing at reference positions of front and rear slides, and often called as a couple distance), and have a front seat inflating portion 11c (which may be either common or different among the respective air bags 11A, 11B and 11C) covering all the protecting range in the respective front seat of plural kinds of cars included in the respective kinds (three kinds), and the rear seat inflating portion 11d (which may be either common or different among the respective air bags 11A, 11B and 11C) covering all the protecting range in the respective rear seat. In this case, in FIG. 1, there is also shown a longitudinal sliding amount Lf of the front seat Sf.

The protecting range mentioned above corresponds to a range of a head portion protecting area of the occupants sitting on the respective seats at least including a petite woman (AF05) in U.S. women and a large man (AM95) in U.S. men, as shown in FIG. 2. In this case, in the front seat Sf, there are respectively shown a regular sitting position at a frontmost of the petite woman (AF05) and a regular sitting position at a rearmost of the large man (AM95). Further, shapes and dimensions of three kinds of tension cloths 12A, 12B and 12C shown in FIGS. 4A to 4C are set on the basis of longitudinal lengths between the respective air bags 11A, 11B and 11C and the respective A pillars 22 of plural kinds of cars employing the air bags.

Accordingly, it is possible to set the constituting parts of the air bag module 10 applied to all kinds of passenger cars (there are about twenty to thirty kinds of cars in one car maker producing multiple kinds of passenger cars) to three kinds of air bags 11A, 11B and 11C, three kinds of tension cloths 12A, 12B and 12C, a single kind of diffuser pipe 13 and a single kind of inflator 14, whereby it is possible to reduce a number of the parts to be manufactured for the air bag module 10 applied to all the kinds of the passenger cars (a number of supplied parts) and it is possible to reduce a cost due to a reduction of the parts.

Further, in the air bag apparatus in accordance with this embodiment, the gas supply port 11a of the air bag 11 is provided between the front seat inflating portion 11c and the rear seat inflating portion 11d, whereby it is possible to supply the gas to the front seat inflating portion 11c and the rear seat inflating portion 11d in the air bag 11 substantially at the same timing and it is possible to inflate and deploy the front seat inflating portion 11c and the rear seat inflating portion 11d in the air bag 11 substantially at the same timing for a short time. Further, in the air bag apparatus in accordance with this embodiment, since the sizes in the vertical direction of the respective air bags 11A, 11B and 11C are the same, it is possible to make the sizes in the vertical direction of all the air bag raw materials the same and it is possible to reduce the cost of the air bag itself.

Further, in accordance with this embodiment, the gas is supplied downward from the inflator 14 to the gas supply port 11a of the air bag 11, the gas is dispersed downward into the gas passage 11b and the auxiliary inflating chamber 11e1 of the air bag 11 in the three-dimensional direction (a radial direction of the shower head 13a) by the shower head 13a provided in the diffuser pipe 13, and the gas after flowing through the auxiliary inflating chamber 11e1 is supplied to the front seat inflating portion 11c and the rear seat inflating portion 11d through the gas passage 11b in a divisional manner. Accordingly, at an early time of inflation and deployment of the air bag 11, the gas passage 11b of the air bag 11 accommodated in the folded manner quickly expands in the vertical direction and the gas flows into the auxiliary inflating chamber 11e1, whereby an area of the air bag 11 exposed to the gas pressure is increased (a gas pressure applied to the air bag 11 is dispersed) and an effective passage area in the gas passage 11b can be sufficiently secure.

Accordingly, a part of the gas passage 11b in the air bag 11 is not exposed to a large load due to the supplied gas, and it is possible to restrict bag damage in the corresponding portion. Accordingly, it is not necessary to provide the protecting member against the gas pressure in the gas passage 11b of the air bag 11 (or it is possible to reduce a number of the protecting members), whereby it is possible to simplify the air bag 11, it is possible to easily fold up the air bag 11 compact, it is possible to make it easier to house the air bag 11 to the vehicle, and it is possible to reduce the cost of the air bag 11.

Further, the gas is supplied downward to the gas supply port 11a of the air bag 11 from the inflator 14 and the gas is supplied to the auxiliary inflating chamber 11e1, whereby the gas passage 11b is expanded in the vertical direction. Accordingly, an effective passage area in the gas passage 11b of the air bag 11 is sufficiently secured, and the gas flow in the longitudinal direction (the gas flow to the front seat inflating portion 11c and the rear seat inflating portion 11d) is improved, so that it is possible to improve the gas supplying performance in the gas passage 11b, it is possible to improve the inflating and deploying performance of the air bag 11, and it is possible to reduce the inflating and deploying time of the air bag 11.

Further, in this embodiment, since the capacity of the auxiliary inflating chamber 11e1 is set to be smaller than the capacity of each of the inflating chambers (the cells) 11c4, 11c5, 11c6 and 11c7 in the front seat inflating portion 11c and each of the inflating chambers (the cells) 11d3, 11d4 and 11d5 in the rear seat inflating portion 11d, it is possible to obtain an effect of restricting bag damage mentioned above in a state where an increase of the deploying time of the air bag 11 is restricted by setting the auxiliary inflating chamber 11e1 small. Further, since the auxiliary inflating chamber 11e1 is structured such as to extend substantially downward, it is possible to promote the downward inflation and deployment of the air bag 11 as a whole due to the downward inflation and deployment of the auxiliary inflating chamber 11e1, and it is possible to reduce the inflating and deploying time of the air bag 11.

Further, in accordance with this embodiment, since the auxiliary inflating chamber 11e1 is independently formed, it is possible to sufficiently achieve a function of the auxiliary inflating chamber 11e 1 in an independent manner. Further, since the auxiliary inflating chamber 11e1 extending substantially downward is formed in a substantially cylindrical shape in an inflating and deploying state, it is possible to stably obtain a downward force applied by the gas supplied within the auxiliary inflating chamber 11e1, and it is possible to stabilize a motion during inflating and deploying the air bag 11.

Further, in this embodiment, since the shower head 13a is formed in the semispherical shape and has a plurality of radially extending injection holes 13a1 on the spherical surface thereof, it is possible to radially inject and supply the gas so as to increase an efficiency of dispersion and supply of the gas, whereby it is also possible to increase the bag damage restricting effect of the air bag 11 and it is possible to improve the inflating and deploying performance of the air bag 11. Further, since the injection holes 13a1 of the shower head 13a are provided in symmetrical with respect to a point of the center (the axis) of the shower head 13a, the gas injecting performance can be obtained without changing even when the shower head 13a is assembled in a state of being rotated around the center thereof. Accordingly, it is possible to change the assembling direction of the shower head 13a, the diffuser pipe 13 and the inflator 14 in the vehicle with hardly changing the gas injecting performance, so that a mounting freedom of the inflator 14 to the vehicle is increased.

Further, in accordance with this embodiment, since the shower head 13a is arranged so as to face the gas passage 11b of the air bag 11, the gas supplied from the inflator 14 is dispersed in the three-dimensional direction by the shower head 13a in the gas passage 11b of the air bag 11. Accordingly, it is possible to properly distribute and supply the gas toward the front seat inflating portion 11c and the rear seat inflating portion 11d of the air bag 11, and it is possible to inflate and deploy the front seat inflating portion 11c and the rear seat inflating portion 11d for a short time.

Further, in this embodiment, since the structure is made such that the shower head 13a does not protrude out within the gas passage 11b of the air bag 11, the fold-up of the air bag 11 is not disturbed by the shower head 13a, it is possible to fold up the air bag 11 in a compact manner, and it is not possible to deteriorate the receiving property of the air bag 11 in the vehicle. Further, since the inflator 14 is arranged in the center portion in the longitudinal direction of the vehicle, it is possible to reduce the length of each of the gas flow passages from the inflator 14 to the front seat inflating portion 11c and the rear seat inflating portion 11d in the air bag 11, and it is possible to reduce the inflating and deploying time of the front seat inflating portion 11c and the rear seat inflating portion 11 in the air bag 11.

Further, in accordance with this embodiment, since the diffuser pipe 13 is formed substantially in the J shape, it is possible to arrange the inflator 14 along the roof side rail 21 in the longitudinal direction or it is possible to arrange the inflator 14 along the roof panel 25 shown in FIG. 9 in the vehicle width direction, while keeping the air bag 11, the inflator 14 and the diffuser pipe 13 in the same structures, so that it is possible to reduce the cost due to the common use of the parts.

Further, in accordance with this embodiment, since the shower head 13a is provided at the front end of the diffuser pipe 13 assembled in the inflator 14, it is possible to correspond in the shape of the diffuser pipe 13 during supplying the gas to the optimum position of the gas passage 11b in the air bag 11, whereby it is possible to commonly use the inflator 14.

Figure 11:
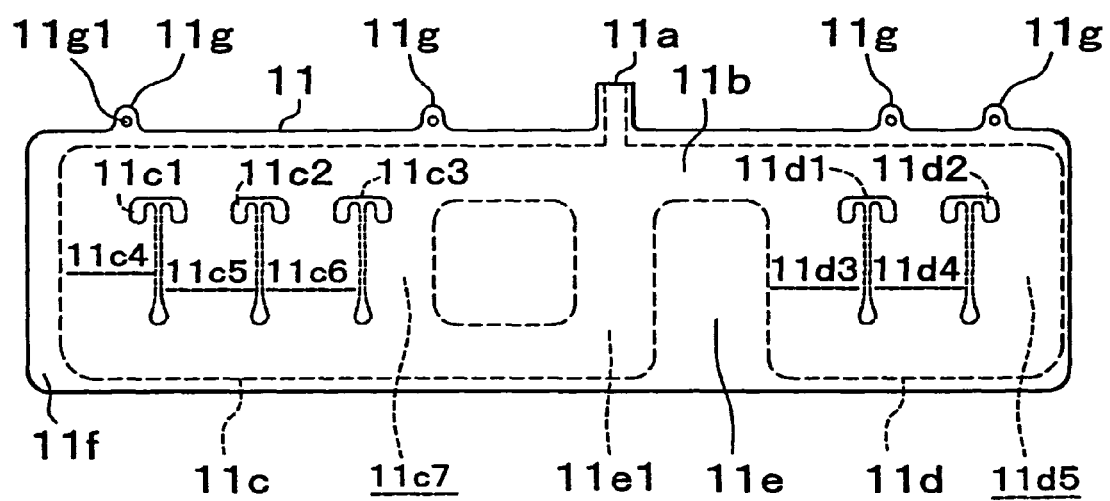
FIG. 11 is a side elevational view showing a first modified embodiment of the air bag shown in FIG. 2.
Figure 12:
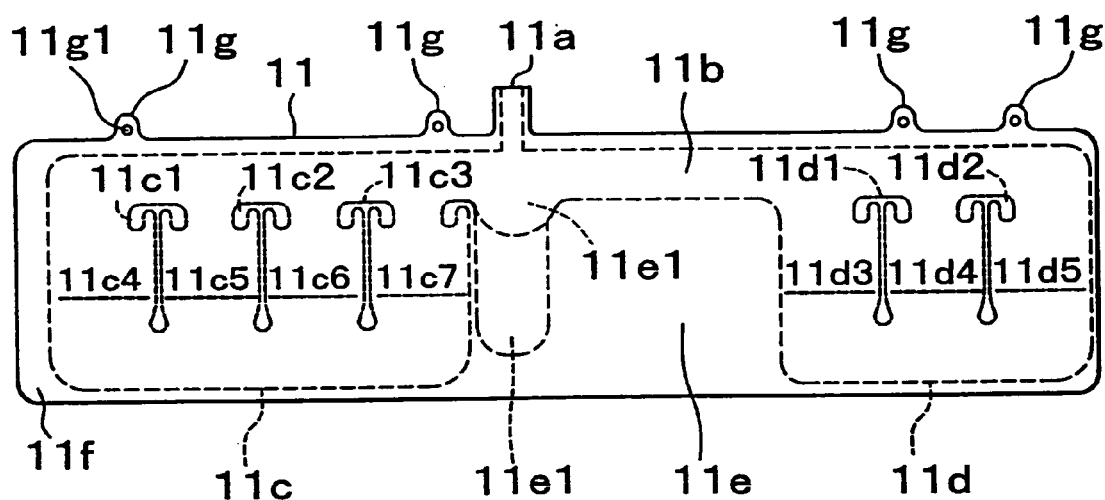
FIG. 12 is a side elevational view showing a second modified embodiment of the air bag shown in FIG. 2.
Figure 13:
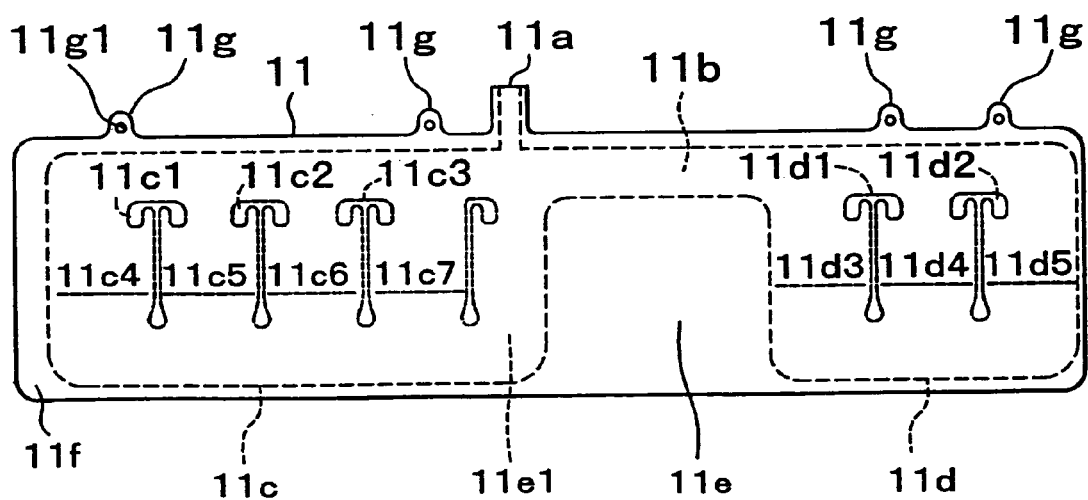
FIG. 13 is a side elevational view showing a third modified embodiment of the air bag shown in FIG. 2.
Figure 14:
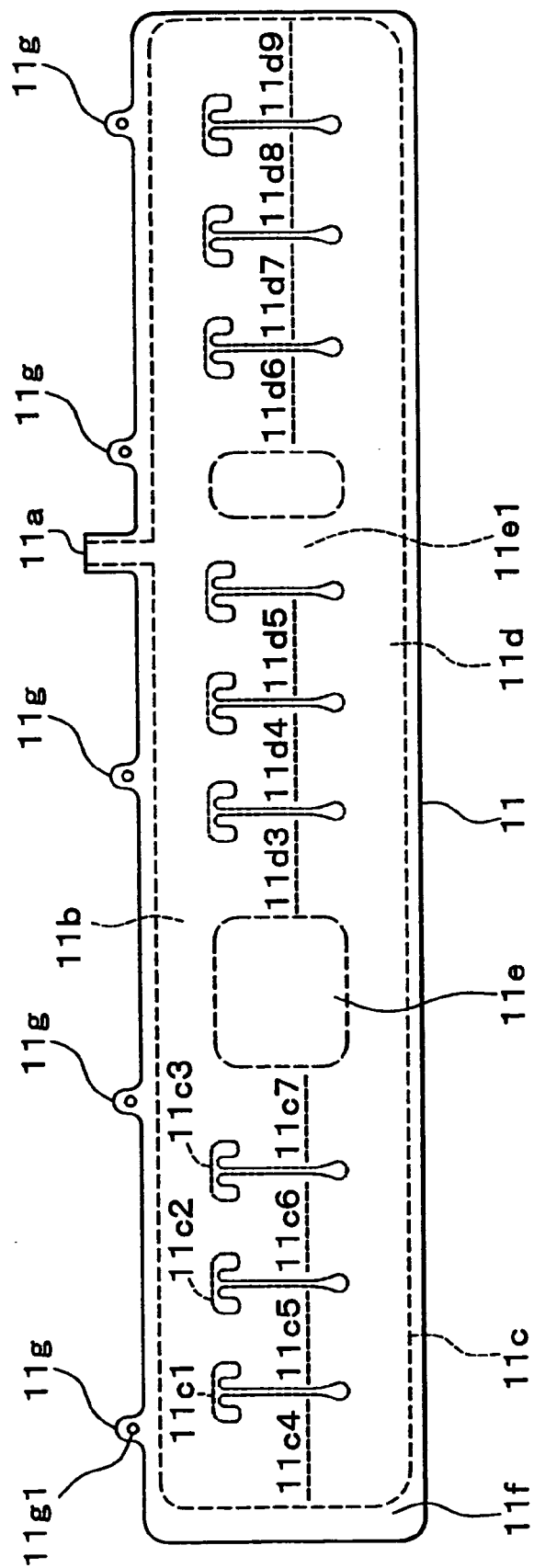
FIG. 14 is a side elevational view showing a fourth modified embodiment of the air bag shown in FIG. 2.

In the embodiment mentioned above, the structure is realized by forming the auxiliary inflating chamber 11e1 independent of each of the inflating chambers (the cells) 11c4, 11c5, 11c6 and 11c7 in the front seat inflating portion 11c and each of the inflating chambers (the cells) 11d3, 11d4 and 11d5 in the rear seat inflating portion, however, it is possible to realize by structuring as an embodiment shown in FIG. 11, an embodiment shown in FIG. 12, an embodiment shown in FIG. 13 or an embodiment shown in FIG. 14.

In the embodiment shown in FIG. 11, the auxiliary inflating chamber 11e1 is communicated with the lower end portion of the inflating chamber 11c7 in the front seat inflating portion 11c at a lower end thereof. Accordingly, the auxiliary inflating chamber 11e1 and the inflating chamber 11c7 are communicated with each other accompanying with inflation and deployment of the air bag 11, and the gas flows from the auxiliary inflating chamber 11e1 to the inflating chamber 11c7. Accordingly, it is possible to also inflate and deploy the inflating chambers 11c4 to 11c7 in the front seat inflating portion 11c by the gas flowing from the auxiliary inflating chamber 11e1 to the inflating chamber 11c7 so as to promote inflation and deployment of the inflating chambers 11c4 to 11c7.

In the embodiment shown in FIG. 12, since the auxiliary inflating chamber 11e1 is arranged close to the inflating chamber 11c7 in the front seat inflating portion 11c, it is possible to utilize the auxiliary inflating chamber 11e1 as an inflating chamber in the front seat inflating portion 11c so as to sufficiently secure the head portion protecting area for the front seat. In this case, in the case that the auxiliary inflating chamber 11e1 is arranged close to the inflating chamber 11d3 in the rear seat inflating portion 11d, it is possible to utilize the auxiliary inflating chamber 11e1 as an inflating chamber in the rear seat inflating portion 11d so as to sufficiently secure the head portion protecting area for the rear seat.

In the embodiment shown in FIG. 13, since the auxiliary inflating chamber 11e1 is arranged in an area corresponding to the B pillar 23(refer to FIG. 1), it is possible to also function the auxiliary inflating chamber 11e1 as a head portion protecting inflating chamber corresponding to the pillar. Further, in this embodiment, in the same manner as that of the embodiment shown in FIG. 11, the auxiliary inflating chamber 11e1 is communicated with the lower end portion of the inflating chamber 11c7 in the front seat inflating portion 11c at the lower end thereof. Accordingly, it is possible to obtain the same operating effect as those of the embodiment shown in FIG. 11.

In the embodiment shown in FIG. 14, the rear seat inflating portion 11d is constituted by an expanding portion for a rear seat front row (having the inflating chambers 11d3 to 11d5) and an expanding portion for a rear seat rear row (having inflating chambers 11d6 to 11d9), the auxiliary inflating chamber 11e1 is provided in connection with the inflating chamber 11d5 in the rear seat front line-row expanding portion, and the gas supply port 11a is provided corresponding to the auxiliary inflating chamber 11e1. Accordingly, in this embodiment, that is, in the embodiment in which the present invention is applied to a head portion protecting air bag apparatus for a vehicle having three rows of seats including two rows of rear seats, it is possible to obtain the same operating effect as those of the embodiment mentioned above.

Further, in the embodiment mentioned above, the structure is made such that the auxiliary inflating chamber 11e1 provided corresponding to the gas supply port 11a of the air bag 11 extends downward from the lower end of the middle portion in the gas passage 11b, however, the structure can be realized by suitably changing a length in the vertical direction of the auxiliary inflating chamber 11e1, and can be realized, for example, by shortening as shown by a virtual line in FIG. 12. It is also possible to control a direction of inflation and deployment of the air bag 11 by the length in the vertical direction of the auxiliary inflating chamber 11e1. That is, as the length in the vertical direction of the auxiliary inflating chamber 11e1 becomes shorter, the air bag 11 is inflated and deployed in a vehicle compartment inside direction, or as the length in the vertical direction of the auxiliary inflating chamber 11e1 becomes longer, the air bag 11 is inflated and deployed downward (toward an extending direction of the auxiliary inflating chamber 11e1).

Figure 15:
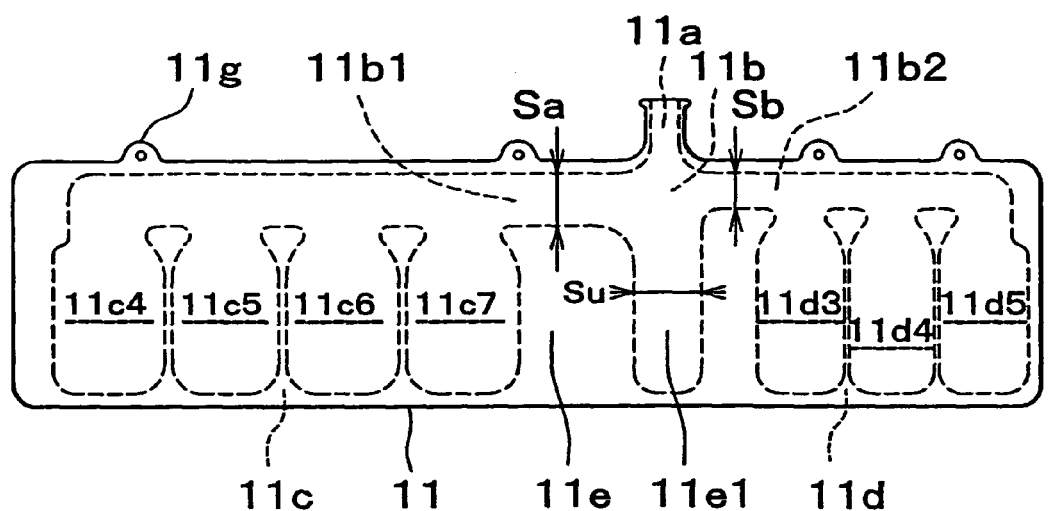
FIG. 15 is a side elevational view showing a fifth modified embodiment of the air bag shown in FIG. 2.

In the embodiment shown in FIG. 15, the front seat inflating portion 11c of the air bag 11 has four independent inflating chambers 11c4 to 11c7, the rear seat inflating portion 11d has three independent inflating chambers 11d3 to 11d5, and the auxiliary inflating chamber 11e1 is formed independent thereof. Further, a ratio between a front portion effective cross sectional area of the gas passage 11b for communicating the gas supply port 11a with the inflating chambers 11c4 to 11c7 in the front seat inflating portion 11c (a circular cross sectional area of the forward portion 11b1 in the gas passage 11b formed in a cylindrical shape during supplying the gas) Sa, and a rear portion effective cross sectional area of the gas passage 11b for communicating the gas supply port 11a with the inflating chambers 11d3 to 11d5 in the rear seat inflating portion 11d(a circular cross sectional area of the rearward portion 11b2 in the gas passage 11b formed in a cylindrical shape during supplying the gas) Sb is set according to a ratio of capacity between the inflating chambers in the front seat inflating portion 11c and the rear seat inflating portion 11d, and the front portion effective cross sectional area Sa is set to be larger than the rear portion effective cross sectional area Sb.

Accordingly, in accordance with this embodiment, it is possible to distribute and supply the gas to the respective inflating chambers (11c4 to 11c7 and 11d3 to 11d5) in the front seat inflating portion 11c and the rear seat inflating portion 11d through the gas passage forward portion 11b1 having the front portion effective cross sectional area Sa and the gas passage rearward portion 11b2 having the rear portion effective cross sectional area Sb, corresponding to the ratio of capacity between the inflating chambers in the front seat inflating portion 11c and the rear seat inflating portion 11d in the air bag 11, and it is possible to substantially simultaneously complete inflation and deployment of the front seat inflating portion 11c and the rear seat inflating portion 11c.

Figure 16:
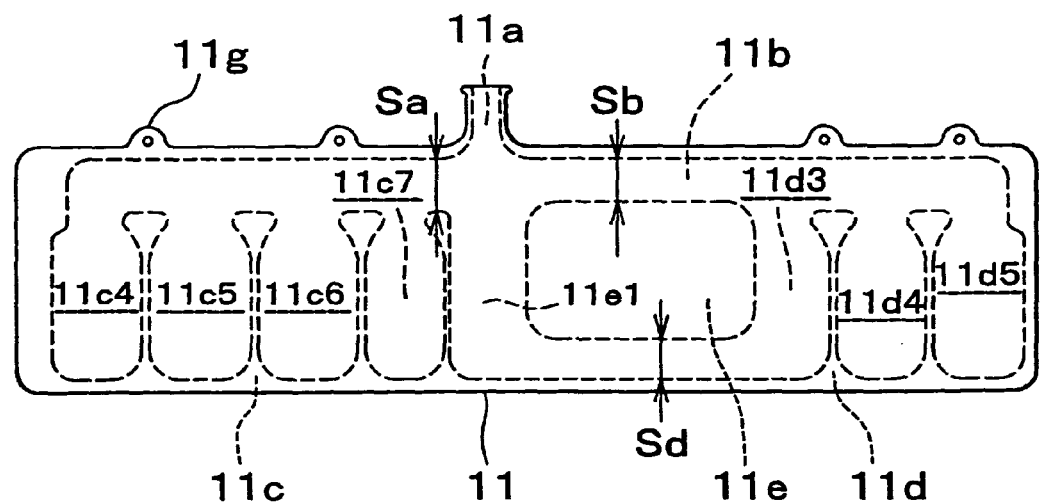
FIG. 16 is a side elevational view showing a sixth modified embodiment of the air bag shown in FIG. 2.

In the embodiment shown in FIG. 16, the lower end of the auxiliary inflating chamber 11e1 is communicated with the lower end of the inflating chamber 11d3 in the rear seat inflating portion 11d, and a ratio between a sum (Sd+Sb) of an effective cross sectional area Sd of the passage for communicating the lower end of the auxiliary inflating chamber 11e1 with the inflating chamber 11d3 of the rear seat inflating portion 11d, and the effective cross sectional area Sb of the gas passage 11b on a communication side for communicating the inflating chambers 11d3 to 11d5 of the rear seat inflating portion 11*d* with the gas supply port 11*a*, and the effective cross sectional area Sa of the gas passage 11*b* on a non-communication side (on a non-communication side communicating the inflating chambers 11*c*4 to 11*c*7 of the front seat inflating portion 11*c* with the gas supply port 11*a*) is set in accordance with the ratio of the capacity of the inflating chamber between the front seat inflating portion 11*c* and the rear seat inflating portion 11*d*.

Accordingly, in accordance with this embodiment, it is possible to distribute and supply the gas to the respective inflating chambers (11*c*4 to 11*c*7 and 11*d*3 to 11*d*5) in the front seat inflating portion 11*c* and the rear seat inflating portion 11*d* corresponding to the ratio of the capacity of the inflating chamber between the front seat inflating portion 11*c* and the rear seat inflating portion 11*d*of the air bag 11, and it is possible to substantially simultaneously complete inflation and deployment of the front seat inflating portion 11*c* and the rear seat inflating portion 11*d*.

In this case, in the embodiment shown in FIG. 16, the structure is realized by communicating the lower end of the auxiliary inflating chamber 11*e*1 with the lower end of the inflating chamber 11*d*3 in the rear seat inflating portion 11*d*, however, the structure can be realized by communicating the lower end of the auxiliary inflating chamber 11*e*1 with the lower end of the inflating chamber 11*c*7 in the front seat inflating portion 11*c*. In this case, a ratio between a sum (Sc+Sa) of an effective cross sectional area Sc of the passage for communicating the lower end of the auxiliary inflating chamber 11*e*1 with the inflating chamber 11*c*7 of the front seat inflating portion 11*c*, and the effective cross sectional area Sa of the gas passage 11*b* on a communication side for communicating the inflating chambers 11*c*4 to 11*c*7 of the front seat inflating portion 11*c* with the gas supply port 11*a*, and the effective cross sectional area Sb of the gas passage 11*b* on a non-communication side (on a non-communication side communicating the inflating chambers 11*d*3 to 11*d*5 of the rear seat inflating portion 11*d* with the gas supply port 11*a*) is set in accordance with the ratio of the capacity of the inflating chamber between the front seat inflating portion 11*c* and the rear seat inflating portion 11*d*.

Figure 17:
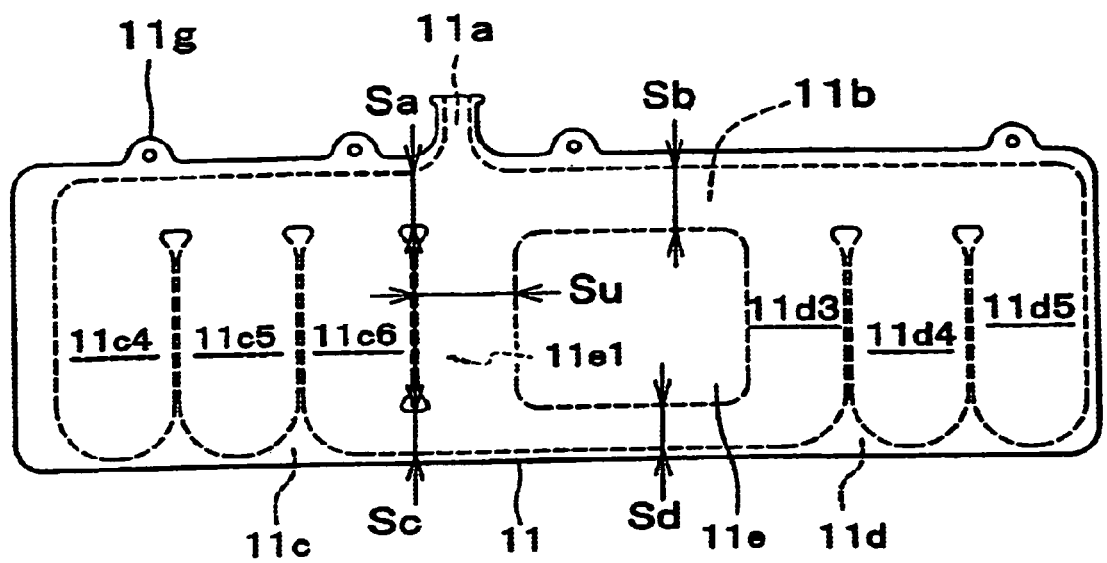
FIG. 17 is a side elevational view showing a seventh modified embodiment of the air bag shown in FIG. 2.

In the embodiment shown in FIG. 17, the lower end portion (the front end portion) of the auxiliary inflating chamber 11*e*1 is communicated with each of the lower end of the inflating chamber 11*c*6 in the front seat inflating portion 11*c* and the lower end of the inflating chamber 11*d*3 in the rear seat inflating portion 11*d*. Accordingly, in this embodiment, since the gas supplied to the auxiliary inflating chamber 11*e*1 is supplied to the lower end of the inflating chamber 11*c*6 in the front seat inflating portion 11*c* and the lower end of the inflating chamber 11*d*3 in the rear seat inflating portion 11*d*, it is possible to reduce a time required for completing the deployment of the air bag 11 to the lower end while restricting the bag damage. In this case, in the embodiment shown in FIG. 17, the auxiliary inflating chamber 11*e*1 commonly serves as an inflating chamber of the front seat inflating portion 11*c*, and the inflating chamber of the front seat inflating portion 11*c* is constituted by the inflating chambers 11*c*4 to 11*c*6 and 11*e*1.

Further, in the embodiment shown in FIG. 17, a ratio between the sum (Sc+Sa) of the effective cross sectional area Sc of the passage for communicating the lower end portion of the auxiliary inflating chamber 11*e*1 with the lower end of the inflating chamber 11*c*6 of the front seat inflating portion 11*c* and the front portion effective cross sectional area Sa of the gas passage 11*b* for communicating the gas passage 11*a* with the inflating chambers 11*c*4 to 11*c*6 of the front seat inflating portion 11*c*, and the sum (Sd+Sb) of the effective cross sectional area Sd of the passage for communicating the lower end portion of the auxiliary inflating chamber 11*e*1 with the lower end of the inflating chamber 11*d*3 of the rear seat inflating portion 11*d*and the rear portion effective cross sectional area Sb of the gas passage 11*b* for communicating the gas supply port 11*a* with the inflating chambers 11*d*3 to 11*d*5 of the rear seat inflating portion 11*d* is set in accordance with the ratio of the capacity of the inflating chamber between the front seat inflating portion 11*c* and the rear seat inflating portion 11*d*. Accordingly, in accordance with this embodiment, it is possible to substantially simultaneously complete inflation and deployment of the front seat inflating portion 11*c* and the rear seat inflating portion 11*d* while restricting the bag damage and reduce the time required for completing the deployment of the air bag 11 to the lower end.

Further, in the embodiment shown in FIG. 17, a sum (Sc+Sd) of the effective cross sectional area Sc of the passage for communicating the lower end portion of the auxiliary inflating chamber 11*e*1 with the lower end of the inflating chamber 11*c*6 of the front seat inflating portion 11*c* and the effective cross sectional area Sd of the passage for communicating the lower end portion of the auxiliary inflating chamber 11*e*1 with the lower end of the inflating chamber 11*d*3 of the rear seat inflating portion 11*d* is set to be equal to or less than an effective cross sectional area Su functioning as a passage of the auxiliary inflating chamber 11*e*1. Accordingly, in accordance with this embodiment, it is possible to sufficiently secure the gas pressure even at the front end portion of the auxiliary inflating chamber 11*e*1, it is possible to accurately supply the gas to the lower ends of the respective inflating chambers 11*c*6 and 11*d*3 in the front seat inflating portion 11*c* and the rear seat inflating portion 11*d* from the front end portion of the auxiliary inflating chamber 11*e*1, and it is possible to obtain a desired air bag deploying performance.

Figure 18:
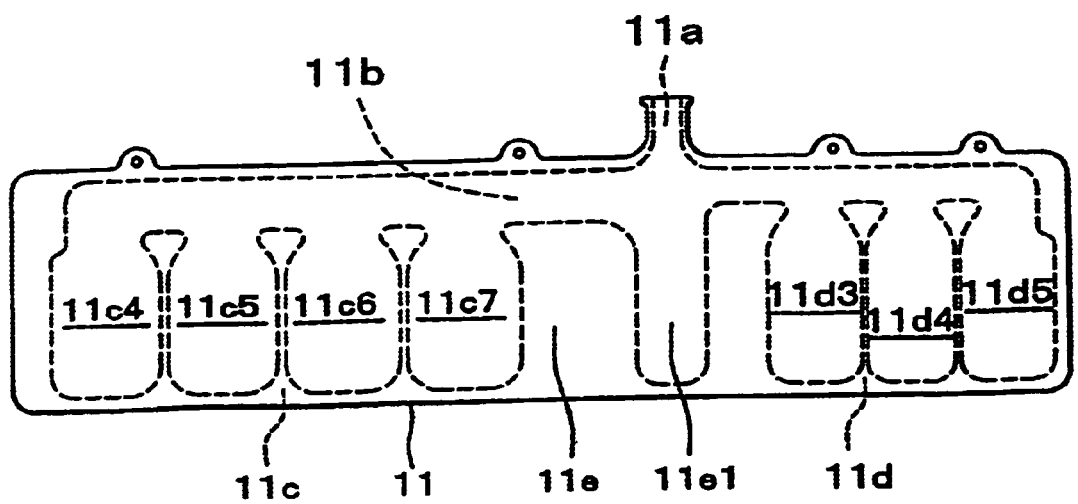
FIG. 18 is a side elevational view showing an eighth modified embodiment of the air bag shown in FIG. 2.

Further, in the embodiment shown in FIG. 18, upper end corner portions of the inflating chambers 11*c*4 and 11*d*5 extending in the vertical direction at both of the front and rear ends of the air bag 11 are set in an area not overlapping with the pillar garnishes (the A pillar garnish and the C pillar garnish) (not shown). Accordingly, in accordance with this embodiment, since the inflating chambers 11*c*4 and 11*d*5 extending in the vertical direction of the front seat inflating portion 11*c* and the rear seat inflating portion 11*d* do not overlap with the pillar garnishes and the deploying resistance is not increased, it is possible to improve a deploying property of the air bag 11 and it is possible to reduce the time required for completing the deployment of the air bag 11.

Further, in the embodiment shown in FIG. 18, the inflating chambers 11*c*4 and 11*d*5 extending in the vertical direction at both of the front and rear ends of the air bag 11 are formed so as to expand a lower area forward or rearward (the lower area in the inflating chamber 11*c*4 is formed so as to expand forward and the lower area in the inflating chamber 11*d*5 is formed so as to expand rearward). Accordingly, in accordance with this embodiment, it is possible to enlarge the head portion protecting area (improve a head portion protecting performance).

Figure 19:
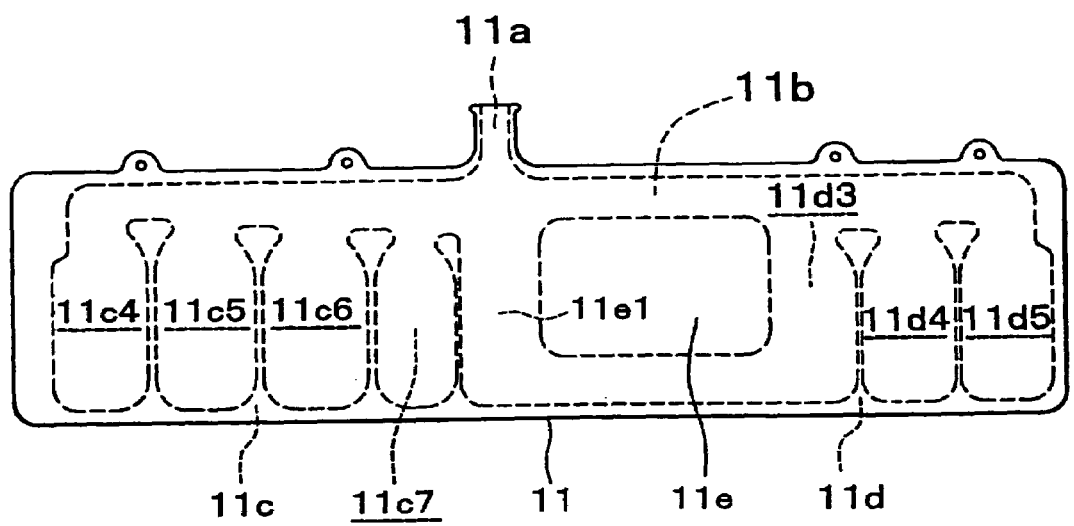
FIG. 19 is a side elevational view showing a ninth modified embodiment of the air bag shown in FIG. 2.

In the embodiment shown in FIG. 19, the gas passage 11*b* formed along the upper edge portion of the air bag is set so that the effective cross sectional area (Sa) of the passage is gradually reduced toward the front end portion thereof. Accordingly, in accordance with this embodiment, it is possible to sufficiently secure the gas pressure in the front end portion of the gas passage 11*b* in the air bag 11, it is possible to accurately supply the gas to the corresponding respective inflating chambers 11c4 and 11c5 from the gas passage 11b, it is possible to improve the deploying property of the air bag 11, and it is possible to reduce the time required for completing the deployment of the air bag 11.

Further, in the embodiment shown in FIG. 19, a lower end line of the gas passage 11b is formed so as to be upwardly inclined toward the front end portion. Accordingly, in accordance with this embodiment, it is possible to oppose the upper end openings of the respective inflating chambers 11c4 to 11c7 formed corresponding to the front portion in the gas passage 11b to the gas flow flowing through the gas passage 11b in an inclined state, whereby it is possible to increase the gas supply efficiency of the corresponding inflating chamber 11c4 to 11c7 so as to improve the deploying performance of the air bag 11.

In this case, in the embodiment shown in FIG. 19, the structure is made such that the gas passages 11b formed along the upper edge portion of the air bag 11 is set so that the effective cross sectional area (Sa) of the passage is reduced toward the front end portion, and the lower end line of the gas passage 11b is formed so as to be upwardly inclined toward the front end portion thereof, however, the structure can be made such that the gas passage 11b formed along the upper edge portion of the air bag 11 is set so that the effective cross sectional area (Sb) of the passage is reduced toward the rear end portion thereof, and the lower end line of the gas passage 11b is formed so as to be upwardly inclined toward the rear end portion thereof. In the embodiment shown in FIG. 20, in addition to the structure of the embodiment shown in FIG. 19, the lower end portion of the auxiliary inflating chamber 11e1 is communicated with each of the lower ends of the respective inflating chambers 11c4 to 11c 7 and 11d3 to 11d5 in the front seat inflating portion 11c and the rear seat inflating portion 11d, and the effective cross sectional area (Sc) of the gas passages for respectively communicating the lower end portion of the auxiliary inflating chamber 11e1 with the lower ends of the respective inflating chambers 11c4 to 11c7 in the front seat inflating portion 11c is set to be reduced toward the front end portion. Accordingly, in accordance with this embodiment, in the gas passage for respectively communicating the auxiliary inflating chamber 11e1 with the lower ends of the respective inflating chambers 11c4 to 11c7 in the front seat inflating portion 11c, it is possible to sufficiently secure the gas pressure in the front end portion of the gas passage, it is possible to accurately supply the gas to the corresponding respective inflating chambers 11c4 to 11c7 from the gas passage, it is possible to improve the deploying property of the air bag 11, and it is possible to reduce the time required for completing the deployment of the air bag 11.

Figure 20:
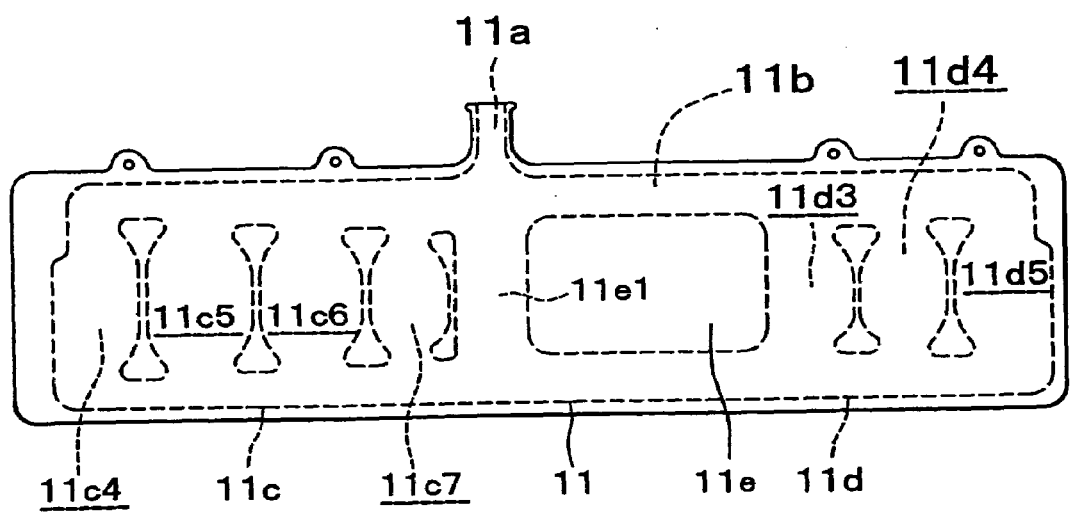
FIG. 20 is a side elevational view showing a tenth modified embodiment of the air bag shown in FIG. 2.

Further, in the embodiment shown in FIG. 20, an upper end line of the gas passages for respectively communicating the lower end portion of the auxiliary inflating chamber 11e1 with the lower ends of the respective inflating chambers 11c4 to 11c7 in the front seat inflating portion 11c is formed so as to be downward inclined toward the front end portion. Accordingly, in this embodiment, it is possible to oppose the lower end openings of the respective inflating chambers 11c4 to 11c7 formed in correspondence with the front portion of the gas passage mentioned above to the gas flow flowing through the gas passage in an inclined state, it is possible to increase a gas supply efficiency to the respective inflating chambers 11c4 to 11c7, and it is possible to improve the deploying performance of the air bag 11. In this case, in the embodiment shown in FIG. 20, the gas passages for respectively communicating the lower end portion of the auxiliary inflating chamber 11e1 with the lower ends of the respective inflating chambers 11c4 to 11c7 in the front seat inflating portion 11c are set so that the cross sectional area (Sc) of the passage is reduced toward the front end portion, and the upper end line of the gas passage is realized so as to be formed to be downward inclined toward the front end portion, however, the gas passage mentioned above may be set so that the effective cross sectional area (Sd) of the passage is reduced toward the rear end portion, and the upper end line of the gas passage may be realized so as to be formed to be downward inclined toward the rear end portion thereof.

Figure 21:
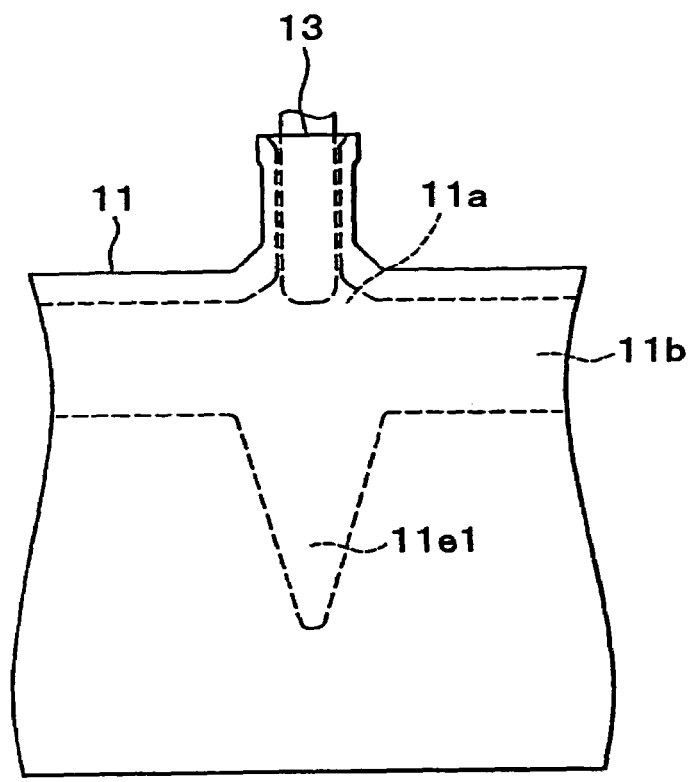
FIG. 21 is an enlarged side elevational view of an essential portion showing an eleventh modified embodiment of the air bag shown in FIG. 2.

In the embodiment shown in FIG. 21, a cross sectional area of the auxiliary inflating chamber 11e1 is set to be reduced toward the lower end (to taper off). Accordingly, in accordance with this embodiment, it is possible to reduce a time required for charging the gas into the auxiliary inflating chamber 11e1 while restricting the bag damage, and it is possible to quicken the deploying speed of the auxiliary inflating chamber 11e1 so as to further reduce the time required for completing the deployment of the air bag.

Figure 22:
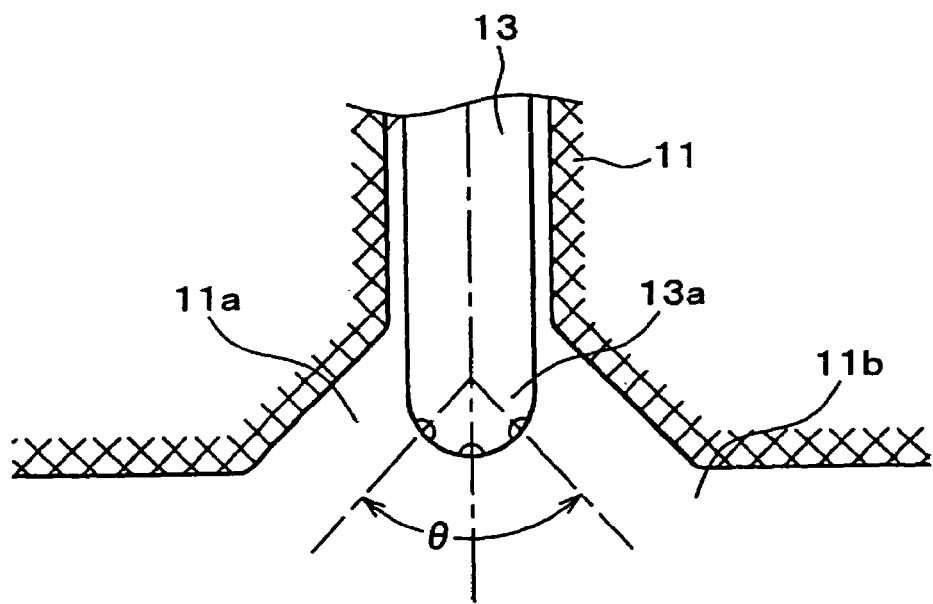
FIG. 22 is an enlarged vertical cross sectional side elevational view showing a twelfth modified embodiment of the air bag shown in FIG. 2.

In the embodiment shown in FIG. 22, a shower head (a diffusing nozzle) 13a connected to the inflator 14 via a diffuser pipe 13 and diffusing the gas in the longitudinal direction at a predetermined angle is provided so as to face the gas supply port 11a of the air bag 11, and the gas supply port 11a is formed in a shape expanding toward the gas passage 11b in the longitudinal direction at an angle equal to or more than an angle θ of diffusion of the shower head 13a. Accordingly, in accordance with this embodiment, it is possible to restrict the gas injected from the shower head 13a from being injected to the gas supply port 11a forming portion of the air bag 11, and it is possible to effectively diffuse and supply the gas to both of the front and rear portions of the gas passage 11b and the auxiliary inflating chamber (omitted in FIG. 22) while reducing the damage of the gas supply port 11a forming portion in the air bag 11.

Figure 23A:
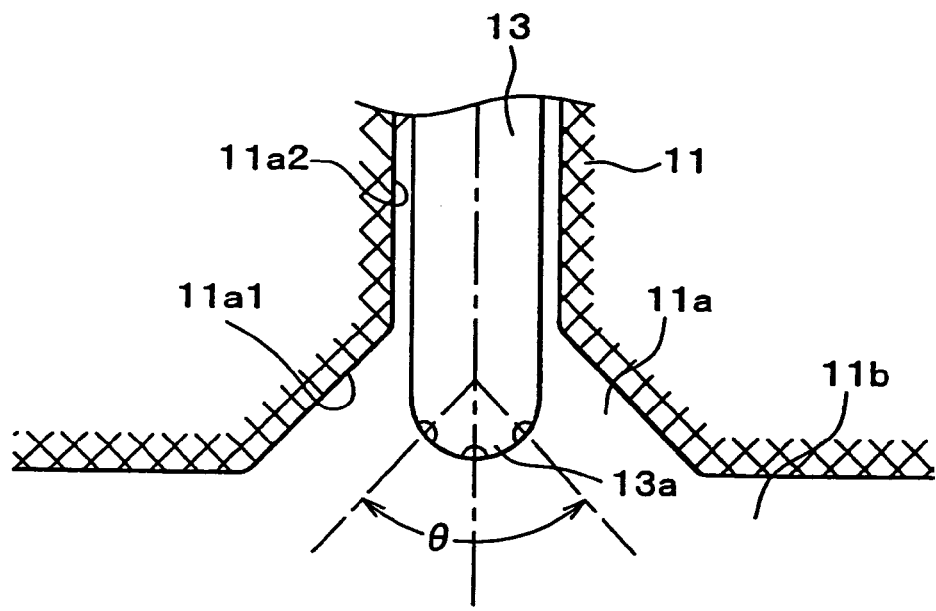
FIGS. 23A and 23B are enlarged views of an essential portion showing a relation between a thirteenth modified embodiment of the air bag shown in FIG. 2 and a diffuser pipe.
Figure 23B:
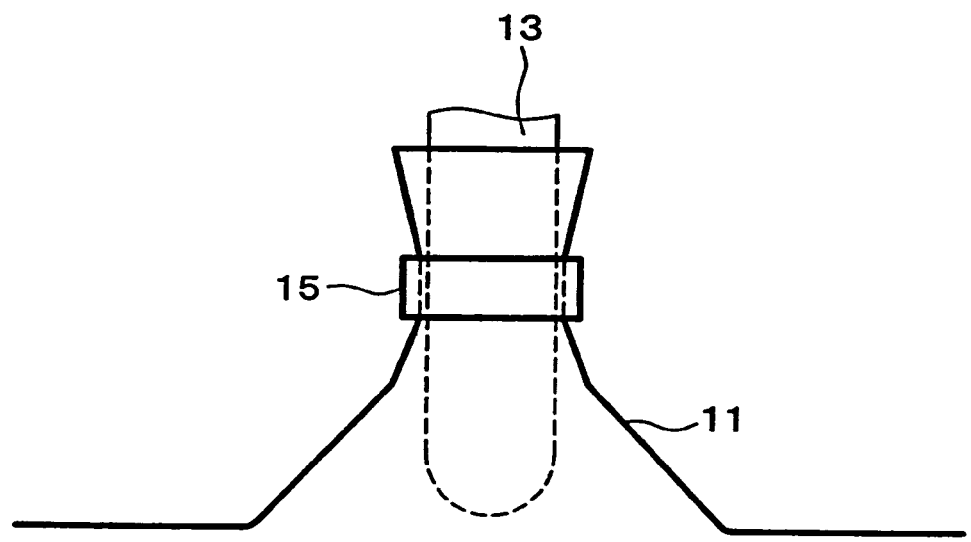

In the embodiment shown in FIGS. 23A and 23B, in addition to the structure of the embodiment shown in FIG. 22, a non-expanded portion 11a2 is formed continuous with the expanded portion 11a1 of the gas supply port 11a, and the air bag 11 and the diffuser pipe 13 are clamped and fixed in the non-expanded portion 11a2 by using a fastening band 15. Accordingly, in accordance with this embodiment, it is possible to clamp and fix the air bag 11 and the diffuser pipe 13 without negatively affecting the expanded portion 11a1 of the air bag 11, it is possible to accurately secure the expanded portion 11a1 of the air bag 11, and it is possible to securely obtain the effect of the embodiment shown in FIG. 22 mentioned above.

Figure 24:
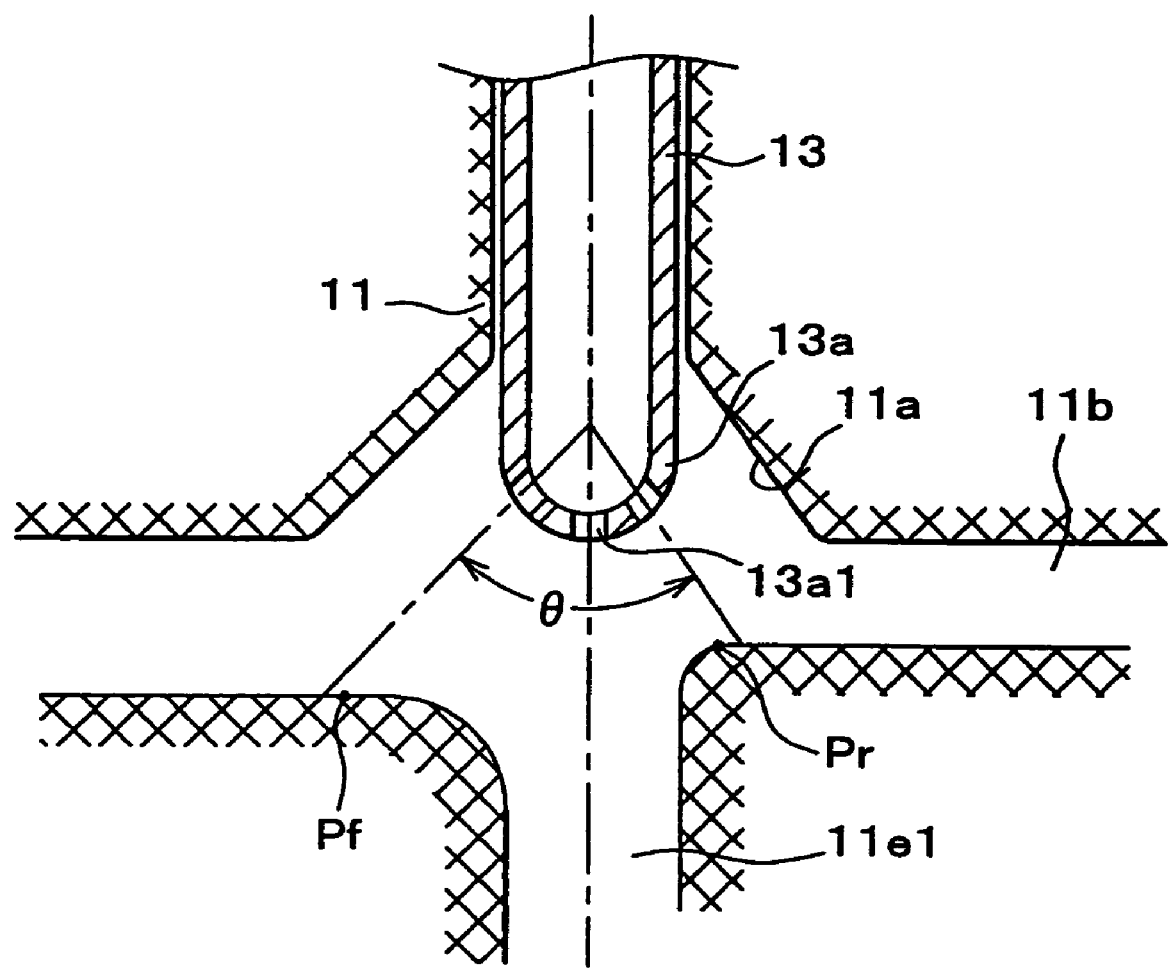
FIG. 24 is an enlarged vertical cross sectional side elevational view of an essential portion showing a fourteenth modified embodiment of the air bag shown in FIG. 2.

In the embodiment shown in FIG. 24, the shower head 13a connected to the inflator 14 via the diffuser pipe 13 and diffusing the gas at the predetermined angle 0 is provided so as to face the gas supply port 11a of the air bag 11 and the gas diffusing angle θ is set so that the gas is injected farther forward than radial end point Pf in front of the upper end of the auxiliary inflating chamber 11e1 and farther rearward than radial end point Pr at the rear of the upper end. Accordingly, in accordance with this embodiment, it is possible to well distribute the gas to the forward portion and the rearward portion of the gas passage 11b in a state where the bag damage is reduced and an inflow of the gas to the auxiliary inflating chamber 11e1 is secured, and it is possible to improve a property of distributing the gas from the shower head 13a in the forward, rearward, and downward directions.

Figure 25:
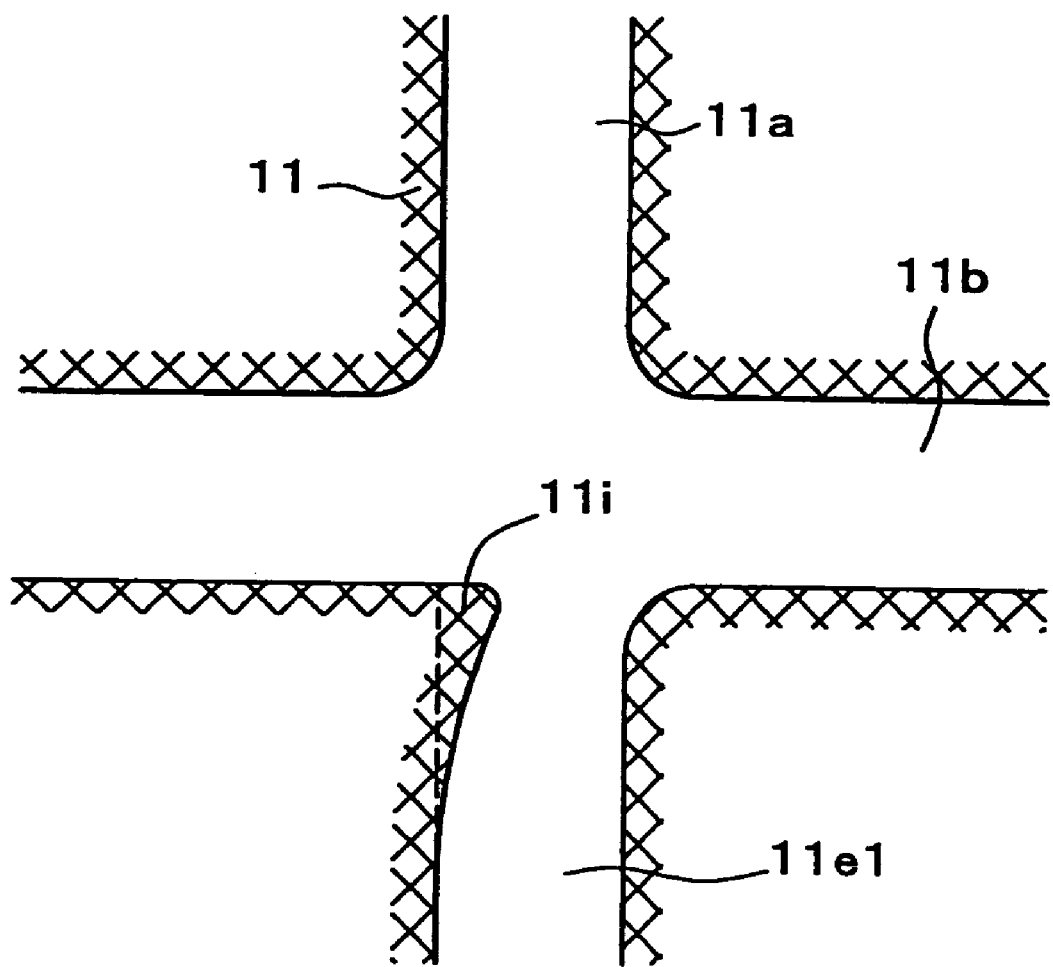
FIG. 25 is an enlarged vertical cross sectional side elevational view of an essential portion showing a fifteenth modified embodiment of the air bag shown in FIG. 2.

In the embodiment shown in FIG. 25, an adjusting throttle portion 11i is set in an inflow port of the auxiliary inflating chamber 11e1. Accordingly, in accordance with this embodiment, it is possible to increase the gas pressure in an upstream of the adjusting throttle portion 11i and it is possible to secure the gas pressure flowing into the auxiliary inflating chamber 11e1, so that even if the auxiliary inflating chamber 11e1 is arranged at a position interfering with the B pillar garnish (33), the auxiliary inflating chamber 11e1 rides over the B pillar garnish so as to inflate and deploy.

In the embodiment shown in FIG. 25, an adjusting throttle portion 11l is set in an inflow port of the auxiliary inflating chamber 11e1. Accordingly, in accordance with this embodiment, it is possible to increase the gas pressure in an upstream of the adjusting throttle portion 11l, and it is possible to secure the gas pressure flowing into the auxiliary inflating chamber 11e1, so that even if the auxiliary inflating chamber 11e1 is arranged at a position interfering with the B pillar garnish (33), the auxiliary inflating chamber 11e1 rides over the B pillar garnish so as to inflate and deploy.

Figure 26:
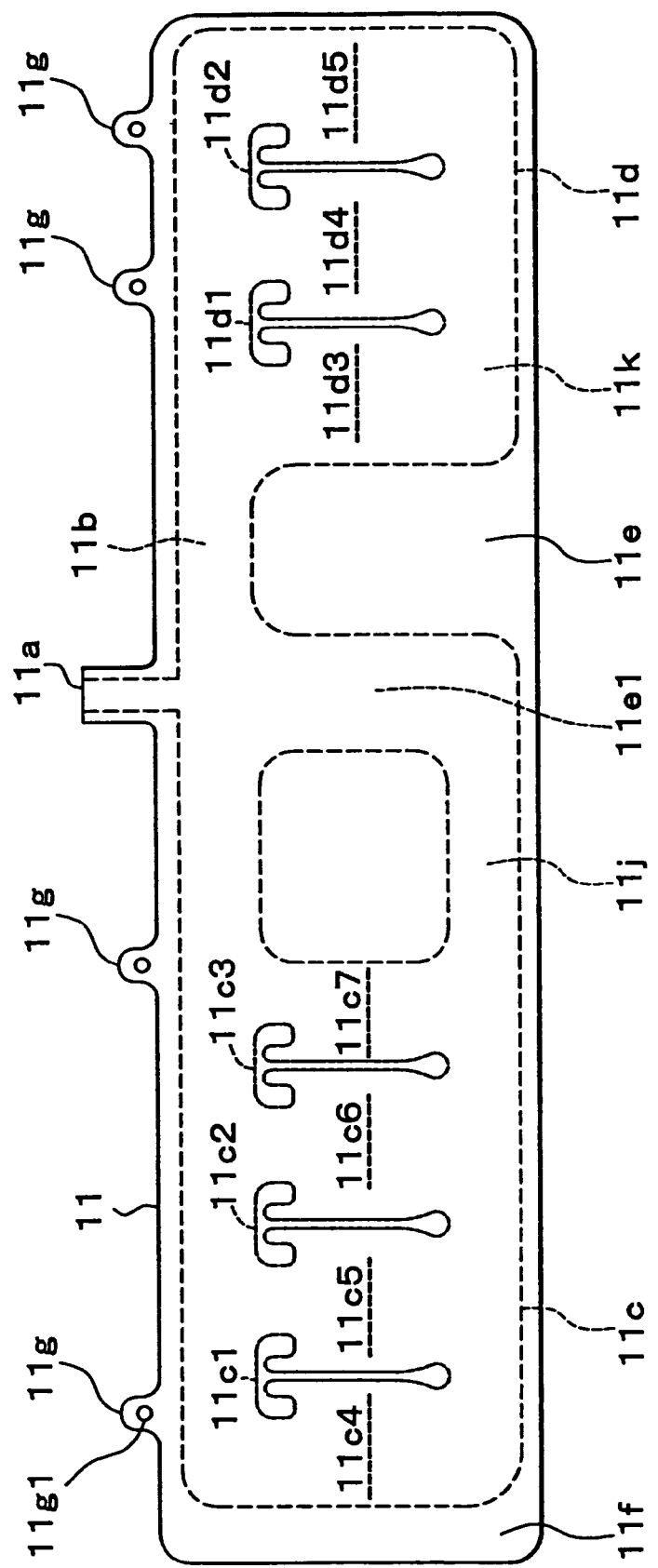
FIG. 26 is a side elevational view showing a sixteenth modified embodiment of the air bag shown in FIG. 2.

In the embodiment shown in FIG. 26, inflating chambers 11j and 11k in a longitudinal direction horizontally crossing an interior side of the B pillar and a division bar (a vehicle body structuring member) during inflating and deploying is set in the lower end portion of the air bag 11. Accordingly, in accordance with this embodiment, it is possible to restrict a movement of the occupant toward an exterior side so as to improve an occupant restricting performance due to a collaborative effect among the inflating chambers 11j and 11k in the longitudinal direction set in the lower end portion of the air bag 11, and the B pillar and the division bar existing in the exterior side thereof in a state that the air bag 11 is inflated and deployed.

Figure 27:
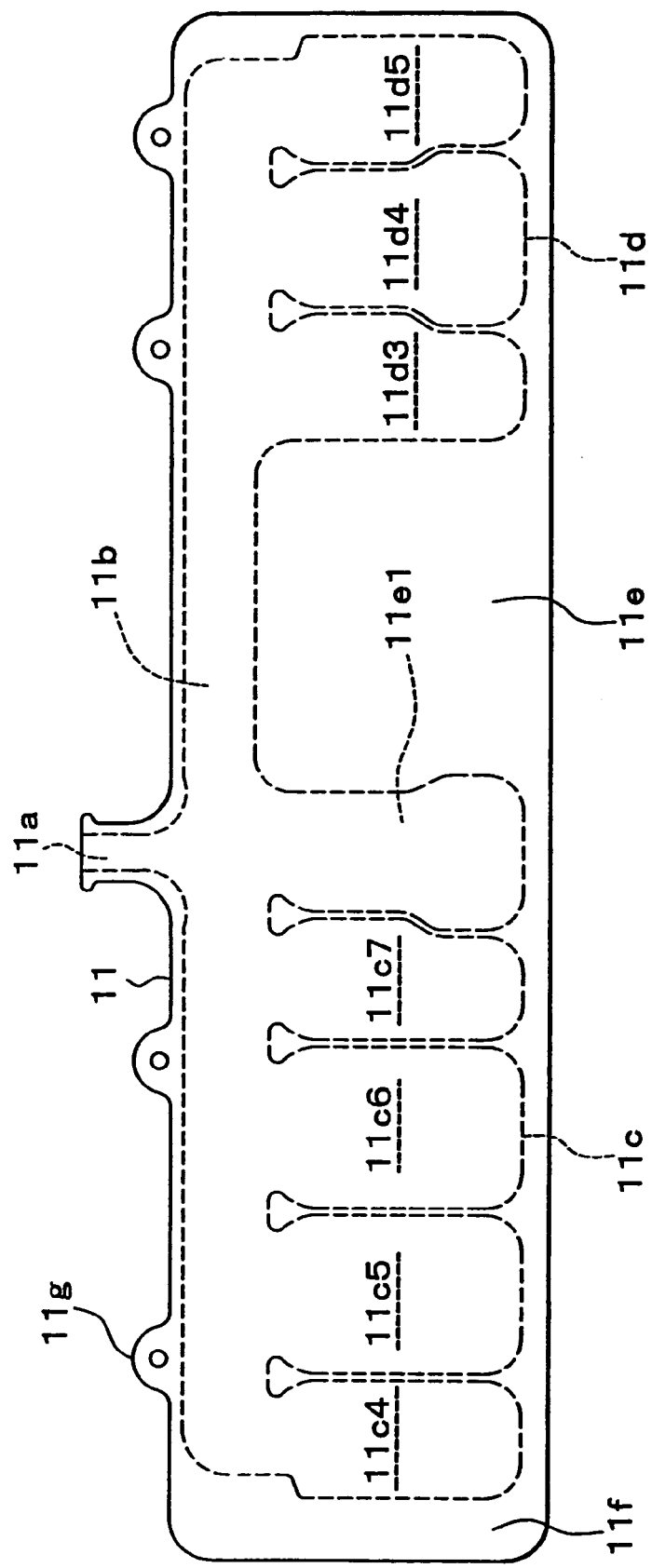
FIG. 27 is a side elevational view showing a seventeenth modified embodiment of the air bag shown in FIG. 2.

In the embodiment shown in FIG. 27, the front seat inflating portion 11c and the rear seat inflating portion 11d of the air bag 11 are constituted by a plurality of independent inflating chambers 11c4 to 11c7 and 11d3 to 11d5 extending in the vertical direction and communicated with the gas passage 11b at an upper end. Further, the lower end portion of the independent auxiliary inflating chamber 11e1 extending in the vertical direction and communicated with the gas passage 11b at the upper end is expanded in the longitudinal direction, and the expanded inflating chamber (11e1) is set so as to cross the room interior side of the B pillar. Further, the lower end portion of the independent rear seat inflating chamber 11d4 extending in the vertical direction and communicated with the gas passage 11b at the upper end is expanded in the longitudinal direction, and the expanded inflating chamber (11d4) is set so as to cross the room interior side of the division bar. Accordingly, in accordance with this embodiment, it is possible to restrict the movement of the occupant toward the exterior side so as to improve the occupant restricting performance due to the collaborative effect among the respective inflating chambers (11e1 and 11d4) set in the lower end portion of the air bag 11 in an expanded manner, and the B pillar and the division bar existing in the exterior side thereof, in a state that the air bag 11 is inflated and deployed.

Figure 28:
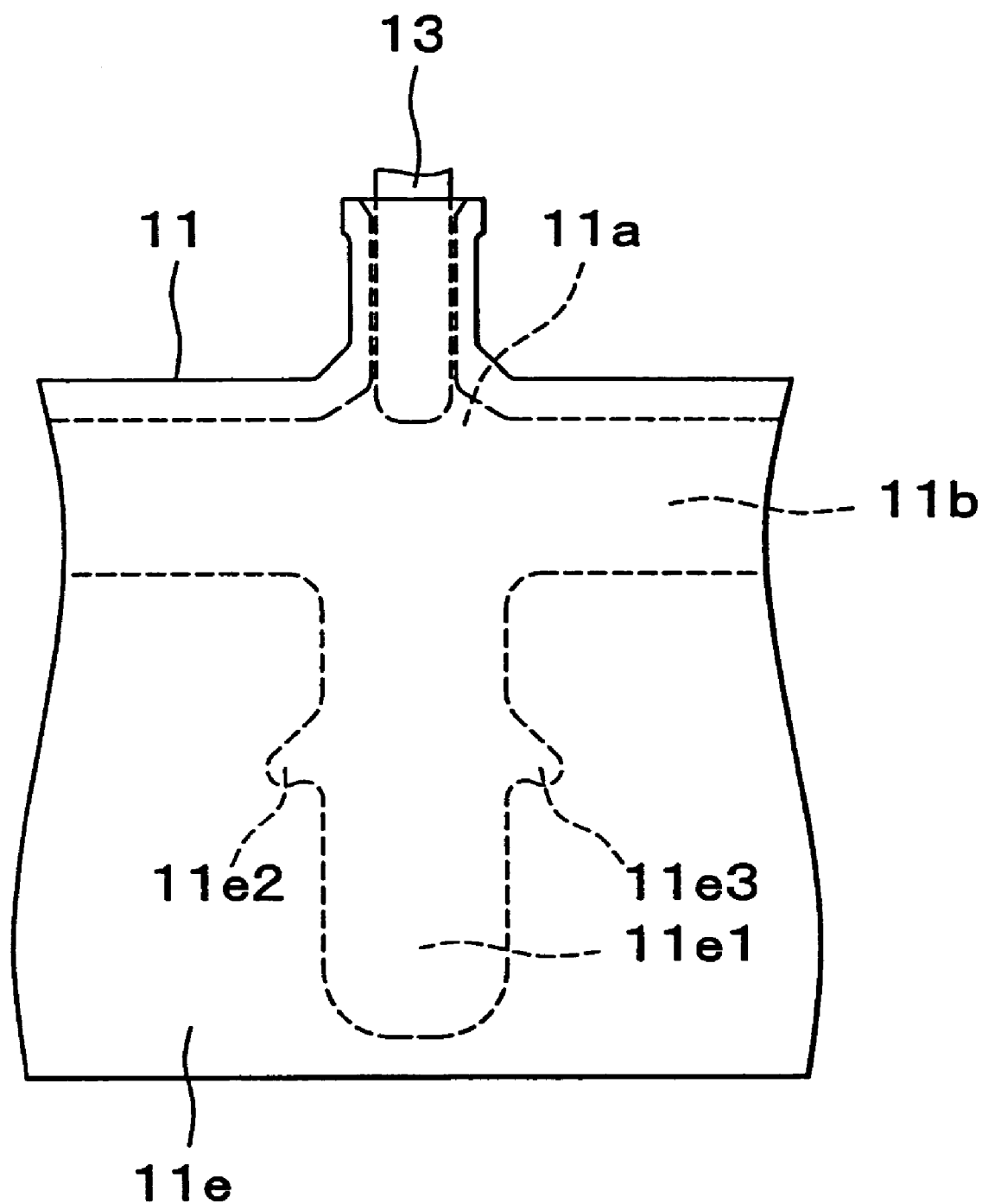
FIG. 28 is an enlarged side elevational view of an essential portion showing an eighteenth modified embodiment of the air bag shown in FIG. 2.

In the embodiment shown in FIG. 28, balancer chambers 11e2 and 11e3 protruding to the forward portion and the rearward portion are set in a middle portion in the vertical direction of the auxiliary inflating chamber 11e1. Accordingly, in accordance with this embodiment, it is possible to apply a tension to a portion close to the balancer chambers 11e2 and 11e3 due to an expansion of the balancer chambers 11e2 and 11e3, it is possible to restrict a flip-flop particularly of a center non-expanded portion 11e during deploying the air bag 11, and it is possible to well deploy the air bag 11 even in a narrow deployment space. In this case, any one of the balancer chamber 11e2 and 11e3 may be omitted.

Figure 29:
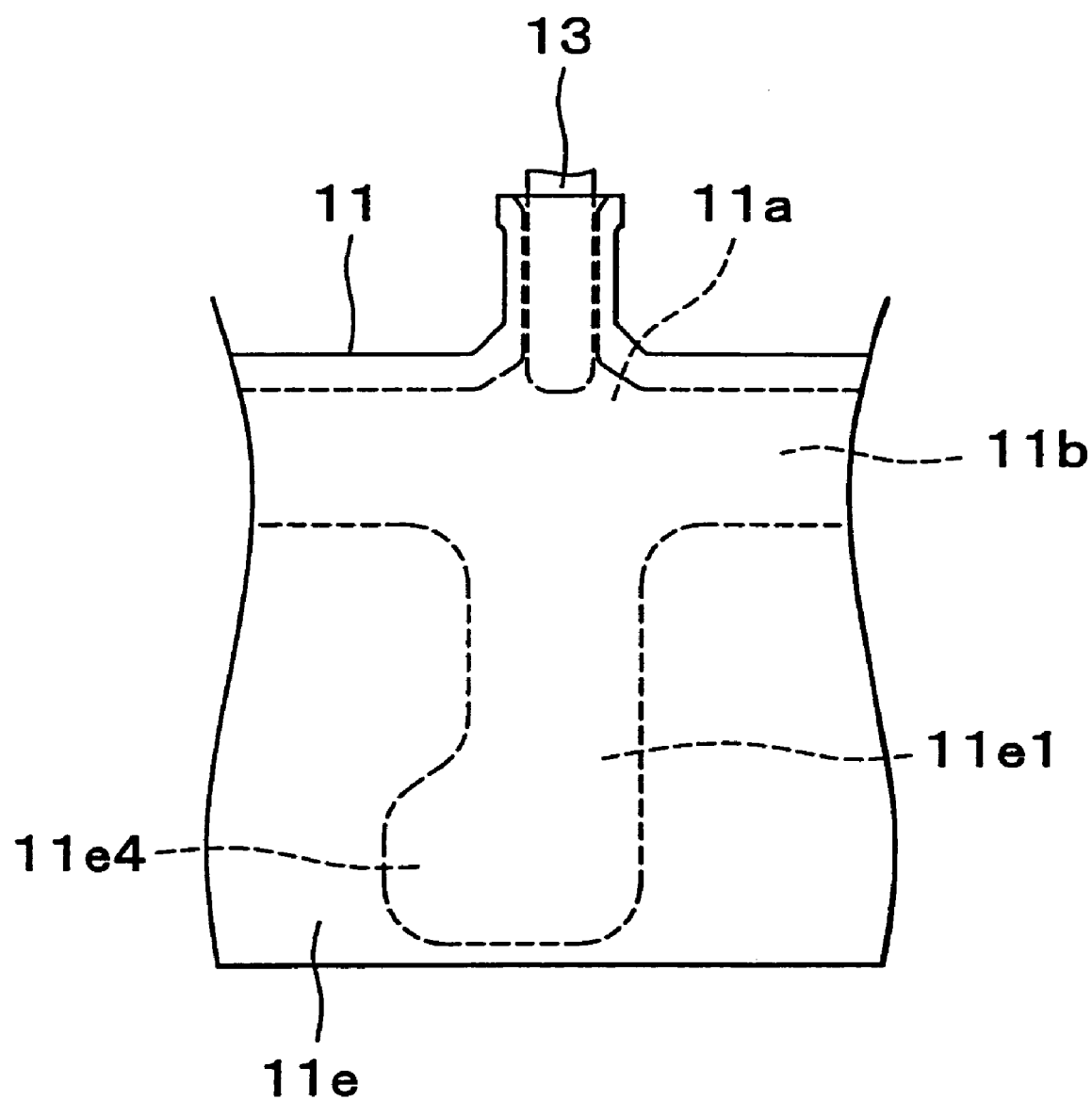
FIG. 29 is an enlarged side elevational view of an essential portion showing a nineteenth modified embodiment of the air bag shown in FIG. 2.

In the embodiment shown in FIG. 29, a deflecting chamber 11e4 for applying a contractile force (a tension) to an intermediate non-expanded portion 11e (a fabric portion) between the front seat inflating portion 11c and the rear seat inflating portion 11d is set in the lower end portion of the auxiliary inflating chamber 11e1. Accordingly, in accordance with this embodiment, the contractile force is applied to the intermediate non-expanded portion 11e (the fabric portion) between the front seat inflating portion 11c and the rear seat inflating portion 11d due to the inflation of the deflecting chamber 11e4, thereby restricting the flip-flop of the intermediate non-expanded portion 11e (the fabric portion) during deploying the air bag 11.

Figure 30:
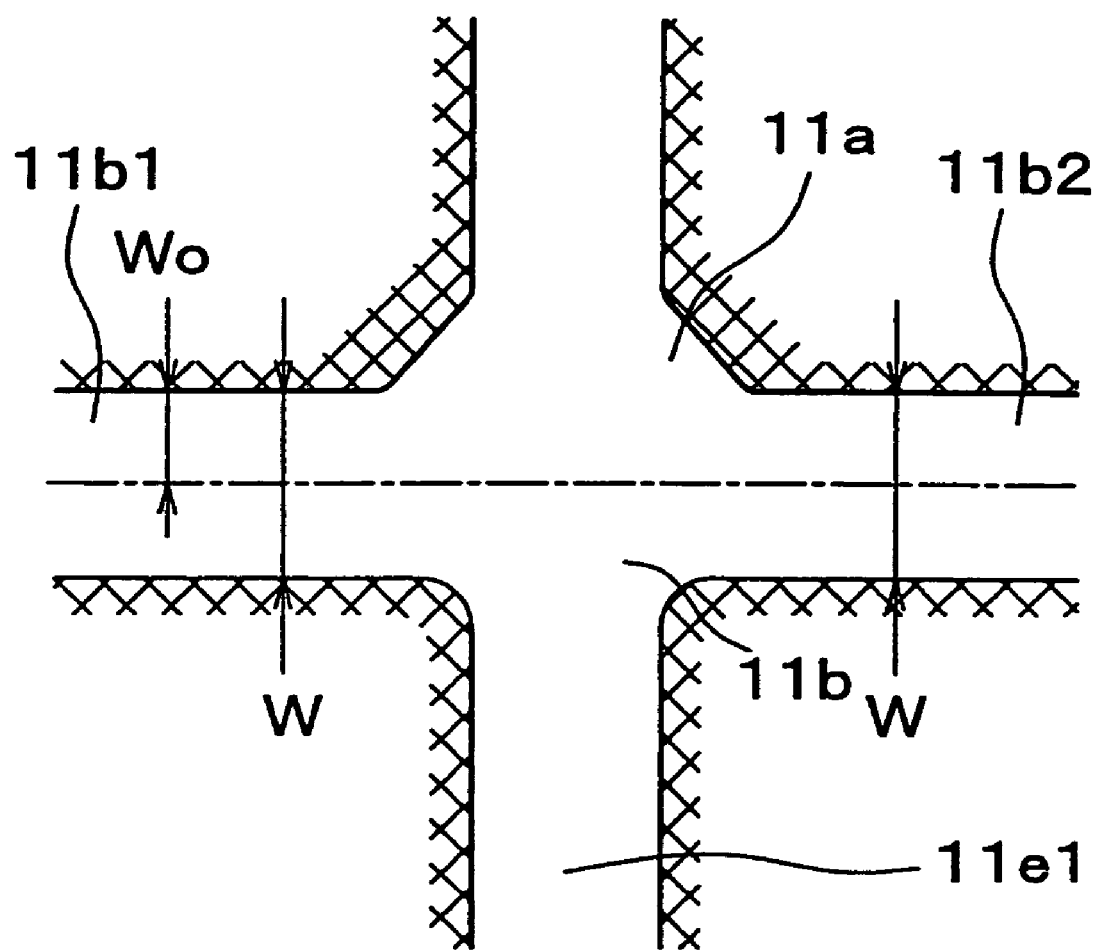
FIG. 30 is an enlarged vertical cross sectional side elevational view of an essential portion showing a twentieth modified embodiment of the air bag shown in FIG. 2.

In the embodiment shown in FIG. 30, a width W of the forward portion 11b1 of the gas passage 11b for supplying the gas from the gas supply port 11a to the front seat inflating portion 11c is made substantially the same width W as the rear portion 11b2 of the gas passage 11b for supplying the gas from the gas supply port 11a to the rear seat inflating portion 11d, and a vertical width W of the gas passages 11b1 and 11b2 is set to an integral multiple (twice in FIG. 30) of a folding width Wo at a time when the air bag 11 is folded up in the vertical direction. Accordingly, in accordance with this embodiment, it is possible to coincide a folding end of the gas passage 11b with an end of the folding width Wo of the air bag 11, and it is possible to secure the bag deploying property.

Figure 31:
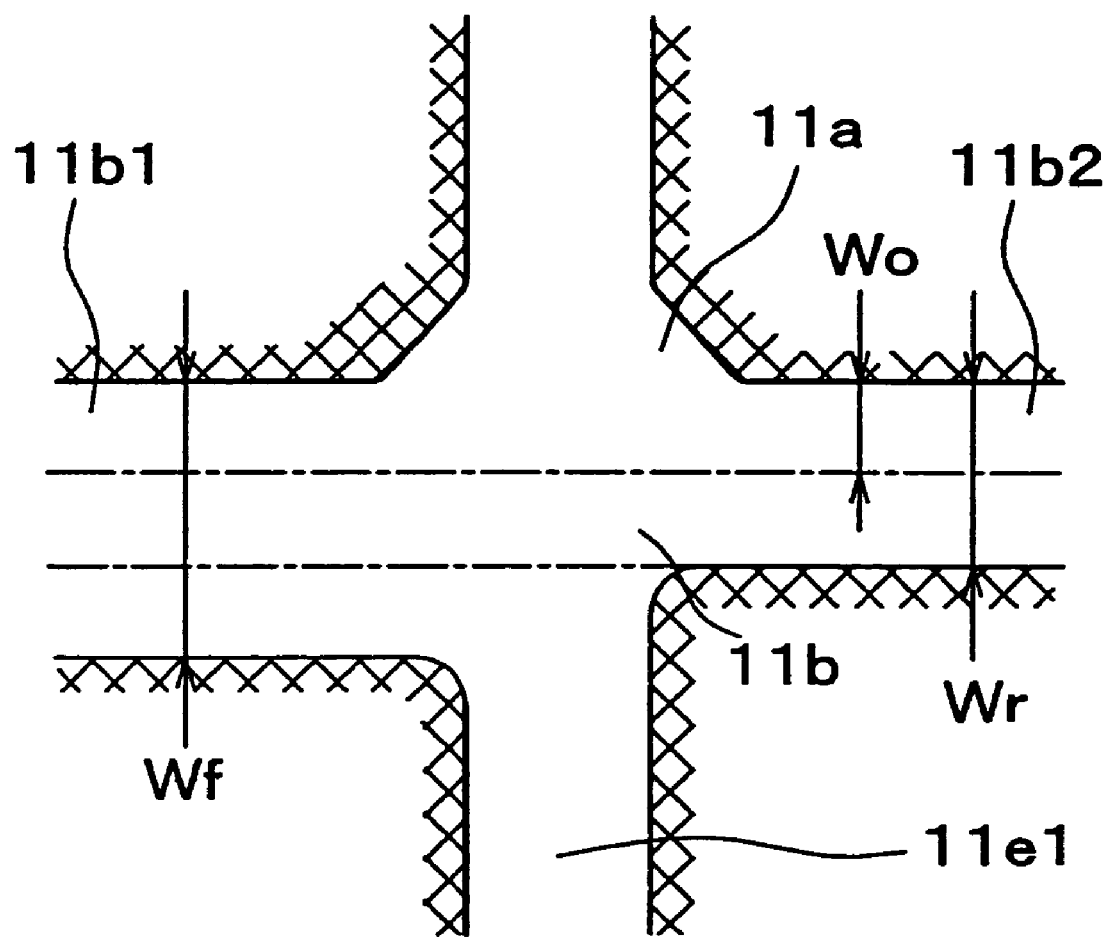
FIG. 31 is an enlarged vertical cross sectional side elevational view of an essential portion showing a twenty first modified embodiment of the air bag shown in FIG. 2.

In the embodiment shown in FIG. 31, a vertical width Wf of the forward portion 11b 1 in the gas passage 11b for supplying the gas from the gas supply port 11a to the front seat inflating portion 11c is set to three times of the folding width Wo at a time when the air bag 11 is folded up in the vertical direction (folded up in an accordion shape), and a vertical width Wr of the rearward portion 11b 2 in the gas passage 11b for supplying the gas from the gas supply port 11a to the rear seat inflating portion 11d is set to twice of the folding width Wo of the air bag 11 mentioned above. Accordingly, in accordance with this embodiment, it is possible to coincide the folding ends of the front and rear gas passages 11b1 and 11b2 with the bending width Wo of the air bag 11 even when the vertical widths Wf and Wr of the front and rear gas passages 11b1 and 11b2 are different from each other, and it is possible to secure the bag deploying property.

Figure 32A:
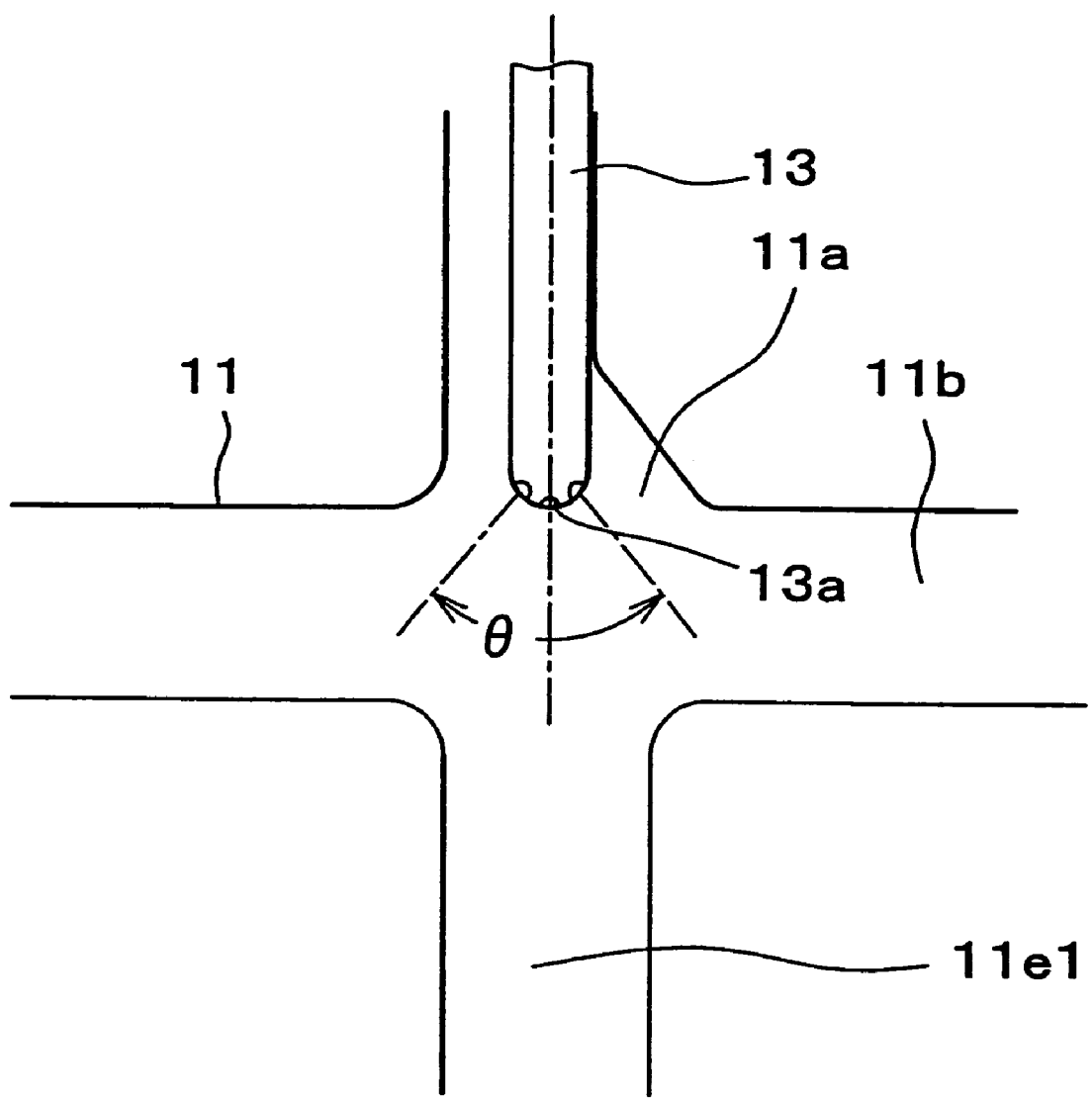
FIGS. 32A and 32B are enlarged side elevational views of an essential portion showing a relation between a twenty second modified embodiment of the air bag shown in FIG. 2 and a diffuser pipe.
Figure 32B:
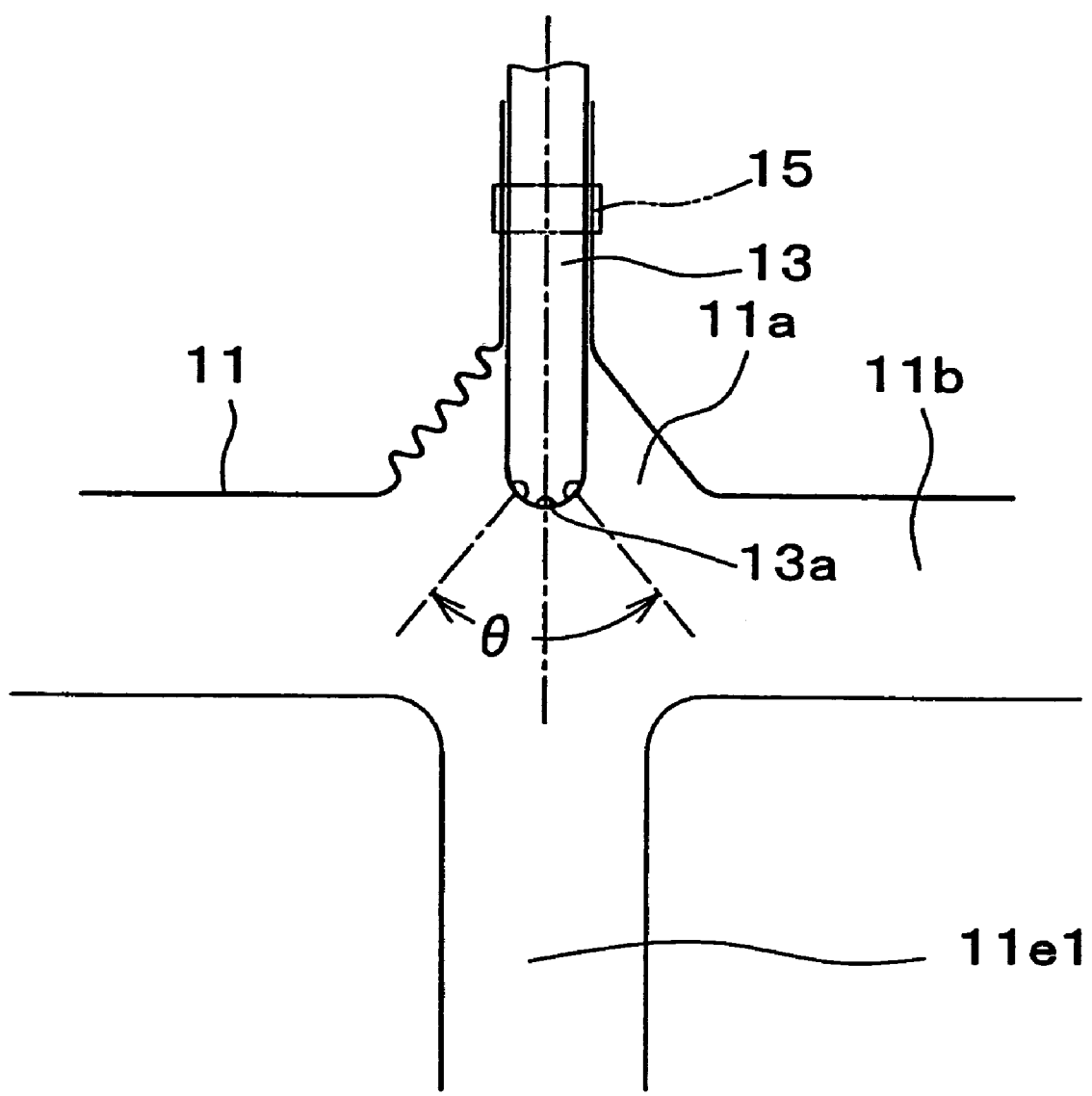

In the embodiment shown in FIGS. 32A and 32B, the shower head 13a connected to the inflator 14 via the diffuser pipe 13 and diffusing the gas at the predetermined angle θ is provided so as to face the gas supply port 11a of the air bag 11, an inclined portion expanding toward the lower portion is formed in the rearward portion of the gas supply port 11a (refer to FIG. 32A), and the air bag 11 and the diffuser pipe 13 are clamped and fixed by using the fastening band 15 in a state where the diffuser pipe 13 has been moved close to the inclined portion (refer to FIG. 32B).

Accordingly, in accordance with this embodiment, it is possible to improve an assembling operability without deteriorating a gas distributing property provided by the shower head 13a. In this case, the structure shown in FIGS. 32A and 32B may be realized by reversing between front and rear.

Figure 33A:
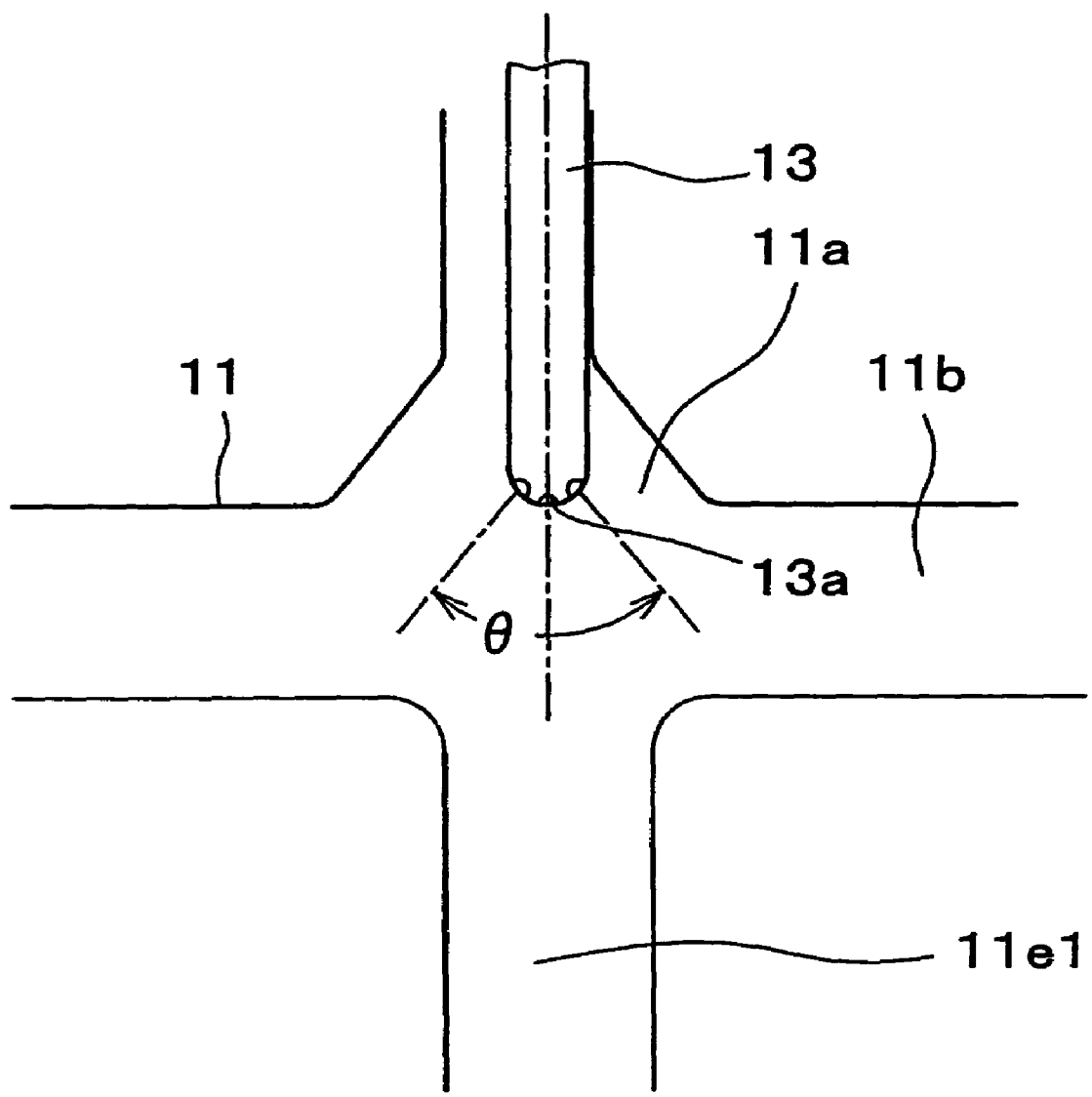
FIGS. 33A and 33B are enlarged side elevational views of an essential portion showing a relation between a twenty third modified embodiment of the air bag shown in FIG. 2 and a diffuser pipe.
Figure 33B:
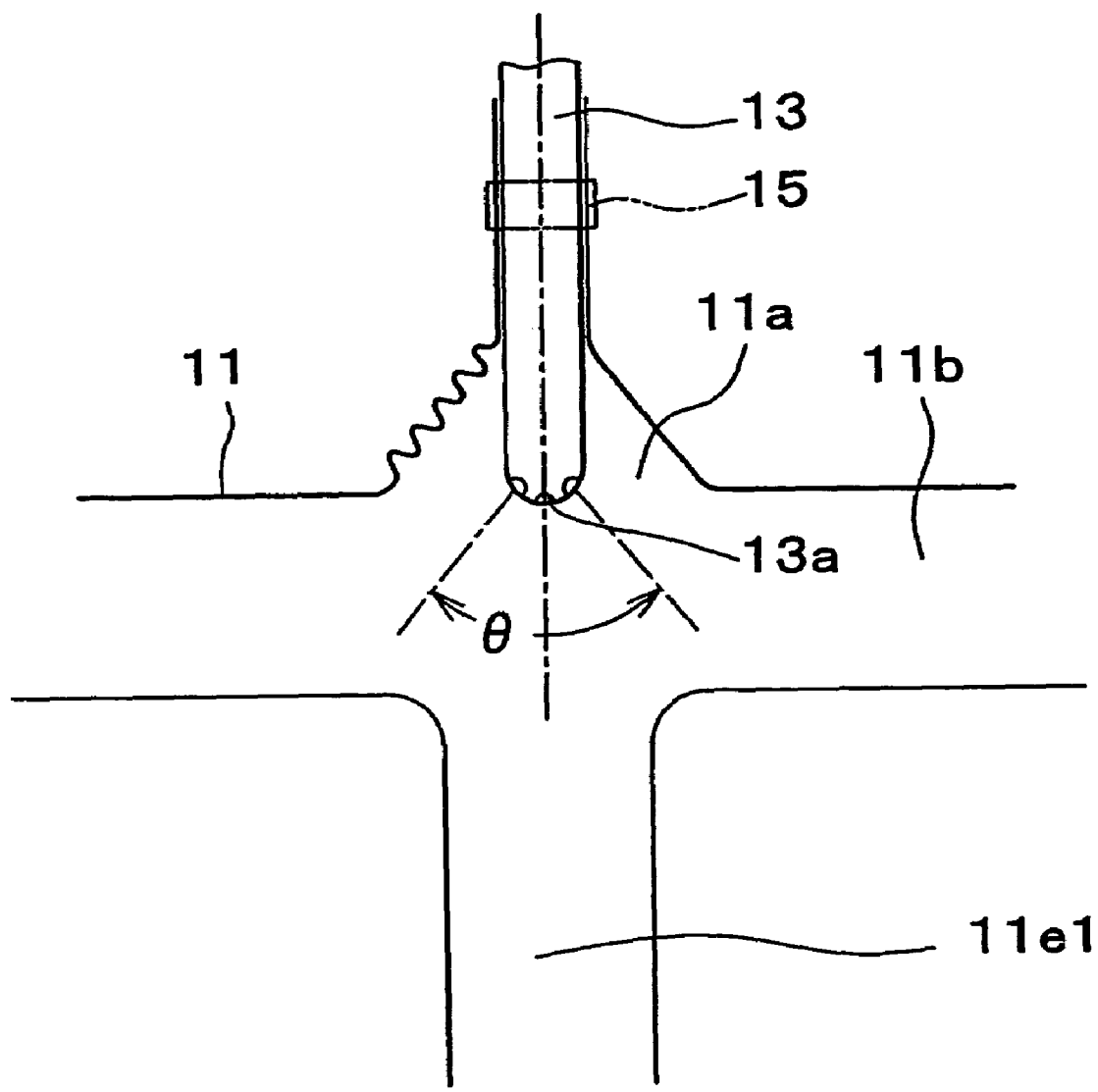

In the embodiment shown in FIGS. 33A and 33B, the shower head 13a connected to the inflator 14 via the diffuser pipe 13 and diffusing the gas at the predetermined angle θ in the longitudinal direction is provided so as to face the gas supply port 11a, the gas supply port 11a is formed in a shape expanding in the longitudinal direction at an angle equal to or more than the angle θ of diffusion of the shower head 13a toward the gas passage 11b (refer to FIG. 33A), and the air bag 11 and the diffuser pipe 13 are clamped and fixed by using the fastening band 15 in a state where the diffuser pipe 13 has been moved close to the rearward portion of the gas supply port 11a (refer to FIG. 33B). Accordingly, in accordance with this embodiment, it is possible to improve an assembling operability without deteriorating a gas distributing property provided by the shower head 13a. In this case, the structure shown in FIGS. 33A and 33B may be realized by reversing between front and rear.

Figure 34:
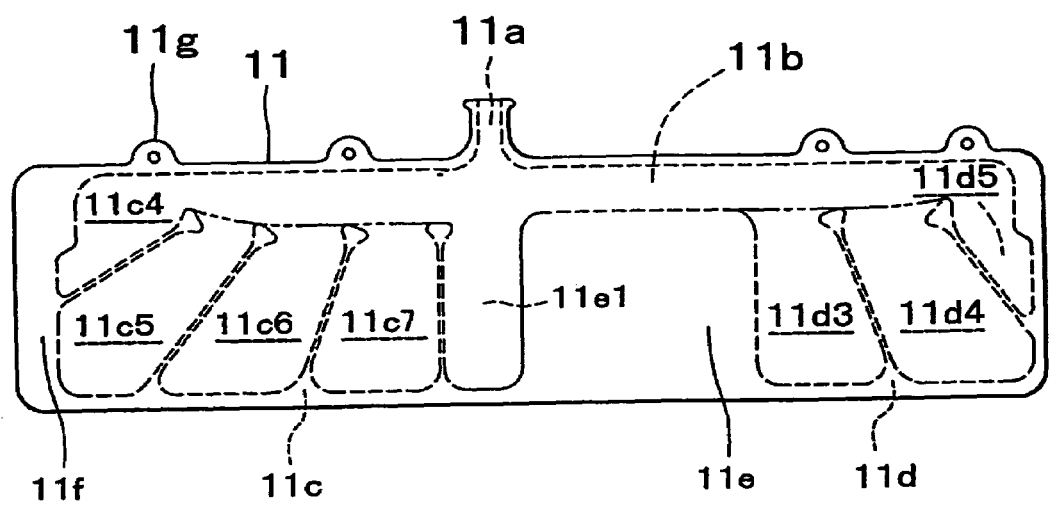
FIG. 34 is a side elevational view showing a twenty fourth modified embodiment of the air bag shown in FIG. 2.

In the embodiment shown in FIG. 34, the front seat inflating portion 11c and the rear seat inflating portion 11d in the air bag 11 are constituted by a plurality of inflating chambers 11c4 to 11c7 and 11d3 to 11d5, and the respective inflating chambers 11c4 to 11c7 and 11d3 to 11d5 have upper ends provided so as to be inclined toward the gas supply port 11a. Accordingly, in accordance with this embodiment, it is possible to move the upper ends of the respective inflating chambers 11c4 to 11c7 and 11d3 to 11d5 constituting the front seat inflating portion 11c and the rear seat inflating portion 11d close to the gas supply port 11a, it is possible to reduce a time required for supplying the gas to the respective inflating chambers 11c4 to 11c7 and 11d3 to 11d5, and it is possible to reduce a time required for completing inflation and deployment of the air bag 11.

Further, in the embodiment shown in FIG. 34, a lower end line (shown by a virtual line in FIG. 34) of the gas passage 11b is formed so as to be upwardly inclined toward the front end portion and the rear end portion. Accordingly, it is possible to oppose the upper end openings of the respective inflating chambers 11c4 to 11c7 and 11d3 to 11d5 to each other in a state of being inclined to the gas flow flowing through the gas passage, whereby it is possible to increase the gas supply efficiency of the respective inflating chambers 11c4 to 11c7 and 11d3 to 11d5 and it is possible to further reduce a time until inflation and deployment of the air bag 11 is completed.

Figure 35:
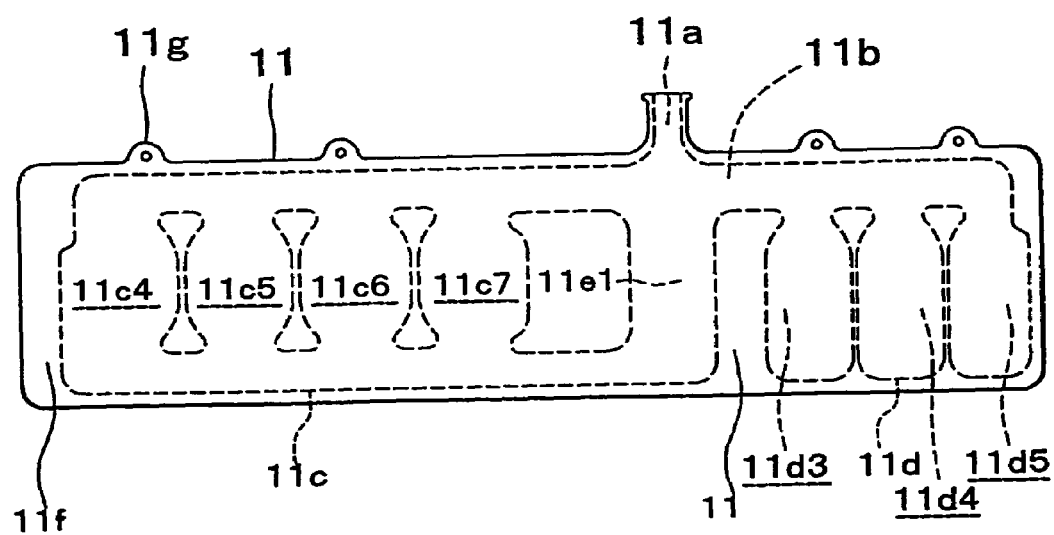
FIG. 35 is a side elevational view showing a twenty fifth modified embodiment of the air bag shown in FIG. 2.

In the embodiment shown in FIG. 35, the lower end of the auxiliary inflating chamber 11e1 is communicated with the lower ends of the inflating chambers 11c4 to 11c7 in the front seat inflating portion 11c, the respective inflating chambers 11c4 to 11c7 extend in the vertical direction so as to be communicated with each other in both of the upper and lower end portions provided with a throttle. Accordingly, in accordance with this embodiment, it is possible to secure the gas pressure before flowing into both of the upper and lower end portions of the respective inflating chambers 11c4 to 11c 7 from the throttle provided in both of the upper and lower end portions of the respective inflating chambers 11c4 to 11c7, and it is possible to supply the gas to the respective inflating chambers 11c4 to 11c7 from the upper and lower portions with a good balance. In this case, in the case that the lower end of the auxiliary inflating chamber 11e1 is communicated with the lower ends of a plurality of inflating chambers 11d3 to 11d5 in the rear seat inflating portion 11c, the structure can be realized by employing the same structure in the side of the inflating chambers 11d3 to 11d5 of the rear seat inflating portion 11c.

The invention claimed is:

1. A head portion protecting air bag apparatus for use with a roof side rail and a vehicle compartment side wall, the apparatus comprising:
   an inflator that supplies a gas;
   an air bag housed along the roof side rail that is inflated and deployed in a curtain shape along the vehicle compartment side wall by the gas supplied from the inflator provided outside of the air bag so as to protect a head portion of an occupant, the air bag including a front seat inflating portion, a rear seat inflating portion, a non-expanding portion provided between the front seat inflating portion and the rear seat inflating portion, and a gas passage communicated with one or more inflating chambers of each of the inflating portions;
   a single gas supply port provided with the air bag so that the single gas supply port opens into the gas passage from upward; and
   an auxiliary inflating chamber provided with the air bag so that the auxiliary inflating chamber is communicated with the gas passage downward of the gas supply port, and the auxiliary inflating chamber opens toward the gas supply port, gas from the inflator being supplied only to the gas supply port;
   wherein the gas passage is accommodated in a folded manner, for quickly expanding in a vertical direction when said air bag is inflated, wherein the inflowing gas firstly flows into the auxiliary inflating chamber to be further supplied to the front seat inflating portion and to the rear seat inflating portion via the gas passage.

2. A head portion protecting air bag apparatus according to claim 1, wherein the auxiliary inflating chamber is independently formed.

3. A head portion protecting air bag apparatus according to claim 2, wherein a ratio between a front portion effective cross sectional area of the gas passage for communicating the gas supply port with an inflating chamber of the front seat inflating portion and a rear portion effective cross sectional area of the gas passage for communicating the gas supply port with an inflating chamber of the rear seat inflating portion is set according to a ratio of the capacity of an inflating chamber between the front seat inflating portion and the rear seat inflating portion.

4. A head portion protecting air bag apparatus according to claim 1, wherein the auxiliary inflating chamber is communicated with one or more inflating chambers of the front seat inflating portion or the rear seat inflating portion at a lower end of the auxiliary inflating chamber.

5. A head portion protecting air bag apparatus according to claim 4, wherein a ratio between:
   (a) a sum of:
      (1) an effective cross sectional area of a passage for communicating the lower end of the auxiliary inflating chamber with the inflating chamber of the front seat inflating portion or the rear seat inflating portion and
      (2) an effective cross sectional area of the gas passage on a communication side for communicating the inflating chamber of the front seat inflating portion or the rear seat inflating portion, having an inflating chamber communicating with the lower end of the auxiliary inflating chamber, with the gas supply port and
   (b) an effective cross sectional area of the gas passage on a non-communication side
   is set in correspondence with a ratio of the capacity of the inflating chamber between the front seat inflating portion and the rear seat inflating portion.

6. A head portion protecting air bag apparatus according to claim 4, wherein the inflating chamber of the front seat inflating portion or the rear seat inflating portion communicating with the lower end of the auxiliary inflating chamber is constituted by a plurality of chambers, and these respective inflating chambers extend in a vertical direction so as to be communicated with each other at both of an upper and lower end portions provided with a throttle.

7. A head portion protecting air bag apparatus according to claim 1 wherein the inflator is arranged in a center portion in a longitudinal direction of the vehicle, and
wherein the inflator is arranged in a vehicle width direction along a roof panel above the air bag.

8. A head portion protecting air bag apparatus according to claim 1, wherein the gas supplied from the inflator is supplied to the gas supply port of the air bag via a diffuser pipe.

9. A head portion protecting air bag apparatus according to claim 8, wherein a shower head for dispersing a gas flow is provided in a lower end portion of the diffuser pipe.

10. A head portion protecting air bag apparatus according to claim 8, wherein a front end portion of the diffuser pipe is arranged substantially parallel to a side glass surface.

11. A head portion protecting air bag apparatus according to claim 1, wherein gas flow dispersing means for dispersing a gas flow is provided in the gas supply port.

12. A head portion protecting air bag apparatus according to claim 1, wherein a lower end portion of the auxiliary inflating chamber is communicated with a lower end of the respective inflating chambers in the front seat inflating portion and the rear seat inflating portion.

13. A head portion protecting air bag apparatus according to claim 12, wherein a ratio between:
(a) a sum of:
    (1) an effective cross sectional area of a passage for communicating a lower end portion of the auxiliary inflating chamber with a lower end of the inflating chamber of the front seat inflating portion and
    (2) a front portion effective cross sectional area of the gas passage for communicating the gas passage with the inflating chamber of the front seat inflating portion
and
(b) a sum of:
    (1) an effective cross sectional area of a passage for communicating the lower end portion of the auxiliary inflating chamber with the lower end of the inflating chamber of the rear seat inflating portion and
    (2) a rear portion effective cross sectional area of the gas passage for communicating the gas supply port with the inflating chamber of the rear seat inflating portion
is set in correspondence with a ratio of the capacity of the inflating chamber between the front seat inflating portion and the rear seat inflating portion.

14. A head portion protecting air bag apparatus according to claim 12, wherein a sum of:
(1) an effective cross sectional area of a passage for communicating the lower end portion of the auxiliary inflating chamber with the lower end of at least one inflating chamber of the front seat inflating portion and
(2) an effective cross sectional area of a passage for communicating the lower end portion of the auxiliary inflating chamber with the lower end of at least one inflating chamber of the rear seat inflating portion
is set to be equal to or less than an effective cross sectional area of the auxiliary inflating chamber.

15. A head portion protecting air bag apparatus according to claim 12, wherein another gas passage for respectively communicating the lower end portion of the auxiliary inflating chamber with the lower ends of the respective inflating chambers of the front seat inflating portion and the rear seat inflating portion is set so that an effective cross sectional area of the another gas passage is reduced toward at least one of a front end portion and a rear end portion of the another gas passage.

16. A head portion protecting air bag apparatus according to claim 1, wherein at least one inflating chamber extending in a vertical direction of the air bag close to a front or rear pillar garnish are formed so as to expand a lower area forward or rearward.

17. A head portion protecting air bag apparatus according to claim 1, wherein a cross sectional area of the auxiliary inflating chamber is set so as to be reduced toward a lower end of the auxiliary inflating chamber.

18. A head portion protecting air bag apparatus according to claim 1, wherein a throttle portion is formed in an inflow port of the auxiliary inflating chamber.

19. A head portion protecting air bag apparatus according to claim 1, wherein an inflating chamber in a longitudinal direction horizontally crossing an interior side of a vehicle body structural member during inflating and deploying is formed in a lower end portion of the air bag.

20. A head portion protecting air bag apparatus according to claim 19, wherein the inflating chamber in a longitudinal direction set in the lower end portion of the air bag is formed by expanding a lower end portion of an independent inflating chamber extending in a vertical direction and communicated with the gas passage at an upper end in the longitudinal direction.

21. A head portion protecting air bag apparatus according to claim 1, wherein a width of a forward portion of the gas passage for supplying the gas from the gas supply port to the front seat inflating portion is made substantially the same as a width of a rear portion of the gas passage for supplying the gas from the gas supply port to the rear seat inflating portion, and a vertical width of the gas passage is set to an integral multiple of a folding width at a time when the air bag is folded up in the vertical direction.

22. A head portion protecting air bag apparatus according to claim 1, wherein the front seat inflating portion and the rear seat inflating portion of the air bag are constituted by a plurality of inflating chambers, and these respective inflating chambers have upper ends provided so as to be inclined toward the gas supply port.

23. A head portion protecting air bag apparatus according to claim 22, wherein a lower boundary line of the gas passage is formed so as to be upwardly inclined toward a front end portion and a rear end portion.

24. A head portion protecting air bag apparatus according to claim 1, wherein the one or more inflating chambers of the front seat inflating portion and the rear seat inflating portion are sectioned into a plurality of sections, and a capacity of the auxiliary inflating chamber is set smaller than a capacity of each of the sectioned inflating chambers.

25. A head portion protecting air bag apparatus according to claim 24, wherein the auxiliary inflating chamber is arranged adjacent to the front seat inflating portion or the rear seat inflating portion.

26. A head portion protecting air bag apparatus according to claim 1, wherein and the auxiliary inflating chamber has a vertical length that is shorter than a vertical length of any inflating chamber.

27. A head portion protecting air bag apparatus according to claim 1, wherein the rear seat inflating portion is formed by an expanding portion for a rear seat front row and an expanding portion for a rear seat rear row.

28. A head portion protecting air bag apparatus according to claim 1, wherein the auxiliary inflating chamber is arranged in an area corresponding to a pillar.

29. A head portion protecting air bag apparatus according to claim 1, wherein the inflator is arranged in a center portion in a longitudinal direction of the vehicle.

30. A head portion protecting air bag apparatus according to claim 29, wherein the inflator is arranged in a longitudinal direction along the roof side rail above the air bag.

31. A head portion protecting air bag apparatus in which an air bag housed along a roof side rail is inflated and deployed in a curtain shape along a vehicle compartment side wall by a gas supplied from an inflator so as to protect a head portion of an occupant, comprising:
a front seat inflating portion;
a rear seat inflating portion;
a gas passage communicated with one or more inflating chambers of each of these inflating portions;
a gas supply port for supplying the gas supplied from the inflator downward, and to the gas passage; and
an auxiliary inflating chamber in communication with the gas supply port,
wherein the gas passage is formed along an upper edge portion of the air bag and an effective cross sectional area of the gas passage is reduced toward at least one of the front end portion and the rear end portion thereof.

32. A head portion protecting air bag apparatus according to claim 31, wherein a lower boundary line of the gas passage is formed so as to be upwardly inclined toward at least one of the front end portion and the rear end portion.

33. A head portion protecting air bag apparatus in which an air bag housed along a roof side rail is inflated and deployed in a curtain shape along a vehicle compartment side wall by a gas supplied from an inflator so as to protect a head portion of an occupant, comprising:
a front seat inflating portion;
a rear seat inflating portion;
a gas passage communicated with one or more inflating chambers of each of these inflating portions;
a gas supply port for supplying the gas supplied from the inflator downward, and to the gas passage; and
an auxiliary inflating chamber in communication with the gas supply port,
wherein a diffusing nozzle connected to the inflator via a diffuser pipe, for diffusing the gas in a longitudinal direction at a predetermined angle, is provided so as to face the gas supply port and the gas supply port is formed in a shape expanding toward the gas passage in the longitudinal direction at an angle equal to or more than an angle of diffusion of the diffusing nozzle.

34. A head portion protecting air bag apparatus according to claim 33, wherein a non-expanded portion is formed continuous with an expanded portion of the gas supply port, and the air bag and the diffuser pipe are clamped and fixed at the non-expanded expanded portion.

35. A head portion protecting air bag apparatus according to claim 33, wherein the air bag and the diffuser pipe are clamped and fixed in a state in which the diffuser pipe has been moved close to the front or the rear of the gas supply port.

36. A head portion protecting air bag apparatus in which an air bag housed along a roof side rail is inflated and deployed in a curtain shape along a vehicle compartment side wall by a gas supplied from an inflator so as to protect a head portion of an occupant, comprising:
a front seat inflating portion;
a rear seat inflating portion;
a gas passage communicated with one or more inflating chambers of each of these inflating portions;
a gas supply port for supplying the gas supplied from the inflator downward, and to the gas passage; and
an auxiliary inflating chamber in communication with the gas supply port,
wherein a diffusing nozzle connected to the inflator via a diffuser pipe, for diffusing the gas at a predetermined angle, is provided so as to face the gas supply port and the gas is injected farther forward than a radial end point in front of an upper end of the auxiliary inflating chamber and farther rearward than a radial end point at a rear of the upper end.

37. A head portion protecting air bag apparatus in which an air bag housed along a roof side rail is inflated and deployed in a curtain shape along a vehicle compartment side wall by a gas supplied from an inflator so as to protect a head portion of an occupant, comprising:
a front seat inflating portion;
a rear seat inflating portion;
a non-expanding portion provided between the front seat inflating portion and the rear seat inflating portion;
a gas passage communicated with one or more inflating chambers of each of these inflating portions;
a gas supply port for supplying the gas supplied from the inflator downward, and to the gas passage; and
an auxiliary inflating chamber in communication with the gas supply port,
wherein a balancer chamber protruding to at least one of a front and a rear is set in a middle portion in a vertical direction of the auxiliary inflating chamber.

38. A head portion protecting air bag apparatus in which an air bag housed along a roof side rail is inflated and deployed in a curtain shape along a vehicle compartment side wall by a gas supplied from an inflator so as to protect a head portion of an occupant, comprising:
a front seat inflating portion;
a rear seat inflating portion;
a non-expanding portion provided between the front seat inflating portion and the rear seat inflating portion;
a gas passage communicated with one or more inflating chambers of each of these inflating portions;
a gas supply port for supplying the gas supplied from the inflator downward, and to the gas passage; and
an auxiliary inflating chamber in communication with the gas supply port,
wherein a deflecting chamber for applying a contractile force to a fabric portion between the front seat inflating portion and the rear seat inflating portion is set in a lower end of the auxiliary inflating chamber.

39. A head portion protecting air bag apparatus in which an air bag housed along a roof side rail is inflated and deployed in a curtain shape along a vehicle compartment side wall by a gas supplied from an inflator so as to protect a head portion of an occupant, comprising:
a front seat inflating portion;
a rear seat inflating portion;
a gas passage communicated with one or more inflating chambers of each of these inflating portions;
a gas supply port for supplying the gas supplied from the inflator downward, and to the gas passage; and
an auxiliary inflating chamber in communication with the gas supply port,
wherein a vertical width of a forward portion of the gas passage for supplying the gas from the gas supply port to the front seat inflating portion is made different from a vertical width of a rear portion of the gas passage for supplying the gas from the gas supply port to the rear seat inflating portion, and respective vertical widths of the forward portion and the rearward portion of the gas passage are set to an integral multiple of a folding width at a time when the air bag is folded up in the vertical direction.

40. A head portion protecting air bag apparatus in which an air bag housed along a roof side rail is inflated and deployed in a curtain shape along a vehicle compartment side wall by a gas supplied from an inflator so as to protect a head portion of an occupant, comprising:

a front seat inflating portion;

a rear seat inflating portion;

a gas passage communicated with one or more inflating chambers of each of these inflating portions;

a gas supply port for supplying the gas supplied from the inflator downward, and to the gas passage; and an auxiliary inflating chamber in communication with the gas supply port, wherein a diffusing nozzle connected to the inflator via a diffuser pipe, for diffusing the gas at a predetermined angle, is provided so as to face the gas supply port, an inclined portion expanding toward a lower portion is formed to a front or a rear of the gas supply port, and the air bag and the diffuser pipe are clamped and fixed in a state in which the diffuser pipe has been moved close to the inclined portion.

* * * * *